US010223696B2

(12) United States Patent
Chen et al.

(10) Patent No.: US 10,223,696 B2
(45) Date of Patent: Mar. 5, 2019

(54) ADAPTIVE BIOMETRIC AND ENVIRONMENTAL AUTHENTICATION SYSTEM

(71) Applicant: BROADCOM CORPORATION, Irvine, CA (US)

(72) Inventors: Xuemin Chen, Rancho Santa Fe, CA (US); John Stuart Walley, Ladera Ranch, CA (US); Robert William Hulvey, Redondo Beach, CA (US); Marcus Christopher Kellerman, Poway, CA (US); Jeyhan Karaoguz, Irvine, CA (US); James Duane Bennett, Hroznětín (CZ)

(73) Assignee: Avago Technologies International Sales PTE. Limited, Singapore (SG)

( * ) Notice: Subject to any disclaimer, the term of this patent is extended or adjusted under 35 U.S.C. 154(b) by 684 days.

(21) Appl. No.: 14/696,341

(22) Filed: Apr. 24, 2015

(65) Prior Publication Data
US 2015/0310444 A1 Oct. 29, 2015

Related U.S. Application Data

(60) Provisional application No. 61/984,395, filed on Apr. 25, 2014.

(51) Int. Cl.
*G06Q 20/40* (2012.01)
*G06Q 20/32* (2012.01)

(52) U.S. Cl.
CPC ... *G06Q 20/40145* (2013.01); *G06Q 20/3224* (2013.01); *G06Q 20/3226* (2013.01); *G06Q 20/4016* (2013.01)

(58) Field of Classification Search
CPC ............................................... G06Q 20/40145
USPC .......................................................... 713/186
See application file for complete search history.

(56) References Cited

U.S. PATENT DOCUMENTS

| 9,185,095 B1* | 11/2015 | Moritz | H04L 63/102 |
| 2006/0195328 A1* | 8/2006 | Abraham | G06Q 20/204 |
| | | | 235/382 |
| 2010/0153470 A1* | 6/2010 | Angell | G06F 21/32 |
| | | | 707/803 |

* cited by examiner

*Primary Examiner* — Kambiz Zand
*Assistant Examiner* — Thanh H Le
(74) *Attorney, Agent, or Firm* — Morgan, Lewis & Bockius LLP

(57) ABSTRACT

An adaptive biometric authentication system may include a user identity reference module that is configured to maintain user identification items stored in a secure memory. The system may include a passive data aggregator that is configured to receive and aggregate data items that are passively collected by a device that is in proximity to a user. The system may include a user identity confidence level generator that is configured to generate a user identity confidence level that indicates a confidence that the user in proximity to the device is the reference user based at least in part on a comparison between the passively collected data items and the user identification items, and to update the user identity confidence level as additional passively collected data items are received. The system may include an authentication module that facilitates user authentication based at least in part on the user identity confidence level.

26 Claims, 8 Drawing Sheets

ADAPTIVE BIOMETRIC AND ENVIRONMENTAL AUTHENTICATION SYSTEM

CROSS-REFERENCE TO RELATED APPLICATIONS

The present application claims the benefit of U.S. Provisional Patent Application Ser. No. 61/984,395, entitled "ENVIRONMENTALLY ADAPTIVE BIOMETRIC AUTHENTICATION SYSTEM" filed on Apr. 25, 2014, which is hereby incorporated by reference in its entirety for all purposes.

TECHNICAL FIELD

The present description relates generally to user and device authentication, and more particularly to an authentication system that adapts based on biometric and environmental data.

BACKGROUND

In the digital age, authentication has become a ubiquitous part of users' lives. Whether using a password to authenticate with a remote email server, or using a pin code to authenticate with a proximal automated teller machine, users may regularly be authenticating with different authentication systems. Accordingly, users may need to keep track of/remember different passwords for each of the authentication systems. Furthermore, static authentication data, such as passwords or fingerprint signatures, may be dependent on the security of the authentication system in which they are being used. For example, if there is a security breach in an authentication system, a user's password or fingerprint signature may be obtainable by a third party. Since the passwords and fingerprint signatures may be static, e.g. they may not regularly change or may be unchangeable, the third party may be able to use the user's password or fingerprint signature to obtain unauthorized access to the user's account.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
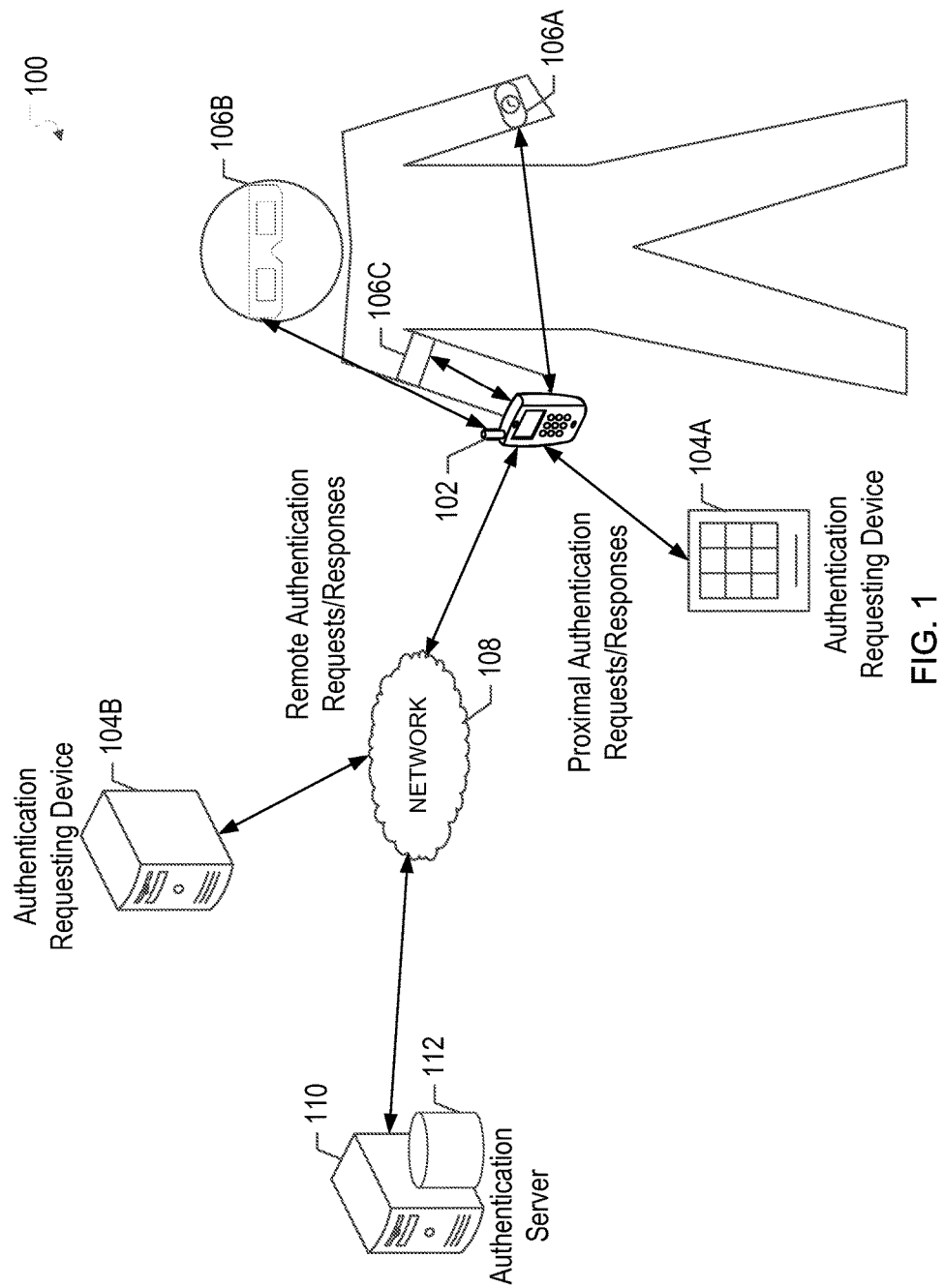
FIG. 1 illustrates an example network environment in which user and device authentication may be implemented in accordance with one or more implementations, wherein current and historical biometric and environmental data are considered in generating authentication ratings.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject system provides for adaptive passive biometric authentication, e.g., providing continuous security assessments of dynamically changing environments and allowing a user to authenticate at least in part using passively collected biometric data, where the level of authentication is adapted based at least on the environmental assessments. In the subject system, one or more biometric sensor devices (e.g., heart rate sensors, image sensors, semiconductor sensors, optical sensors, ultrasound sensors, etc.) may passively collect time-varying biometric data from a user, e.g. without prompting the user. The subject system (e.g., operating via a secure processing element on a mobile device of a user, such as a smartphone, or via a cloud based system) may receive the passively collected biometric data for the user and may generate at least one biometric predictive model for the user based at least on the biometric data and one or more environmental variables collected in conjunction with the biometric data, such as time of day, day of week, location of the user, movement of the user, etc. The subject system may use the biometric predictive model to predict expected biometric data values for the user based at least on one or more current environmental variables, e.g. time of day, the location of the user, etc.

The subject system may then receive requests for authentication of the user, such as remote requests from servers, e.g. email servers, and/or proximal requests from local devices, e.g. automated teller machines, point-of-sale terminals, etc. In response to receiving a request, the subject system may determine an authentication threshold, e.g. a match threshold, or level based on the current environment in which the user is located. For example, the subject system may utilize a lower authentication threshold when the user is located in their home and a higher authentication threshold when the user is located in a less secure location (e.g. based on historical location data collected for the user). The subject system may passively collect current biometric data from the user temporally proximal to the time that the request was received, and may compare the current biometric data to predicted biometric data generated by the biometric reference model, e.g. by applying the current values of the environmental variables used to generate the biometric reference model, e.g. time of day, location, etc. If the comparison of the current biometric data to the predicted biometric data satisfies the match threshold determined for the environment in which the user is located, then the subject system may authenticate the user. If the comparison does not satisfy the match threshold, the authentication of the user may fail. In one or more implementations, if the comparison does not satisfy the match threshold, the subject system may request an additional authentication measure from the user, such as actively collected biometric data, e.g. a request for a fingerprint.

FIG. 1 illustrates an example network environment 100 in which user and device authentication may be implemented in accordance with one or more implementations, wherein current and historical biometric and environmental data are considered in generating authentication ratings. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The network environment 100 includes a network 108, an electronic device 102, one or more electronic sensor devices 106A-C, one or more authentication requesting devices 104A-B, and an authentication server 110. The network 108 may include, and/or may be communicatively coupled to, one or more of the Internet, a private network, a wearable devices network, an internet of things network, or other networks. The network 108 may include one or more wired or wireless network devices that facilitate device communications of the electronic device 102, the authentication requesting devices 104A-B, and/or the authentication server 110, such as switch devices, router devices, relay devices, etc., and/or may include one or more servers. In one or more implementations, the electronic device 102 may establish a direct network connection, e.g. via Bluetooth, near-field communication (NFC), WiFi Direct, etc., with one or more of the authentication requesting devices 104A-B, such as the authentication requesting device 104A as depicted in FIG. 1, and/or one or more of the electronic sensor devices 106A-C, without communicating through the network 108. In one or more implementations, one or more of the electronic sensor devices 106A-C may be communicatively coupled to the electronic device 102 via the network 108, such as a network camera device.

The electronic device 102 is depicted in FIG. 1 as a smartphone. However, the electronic device 102 may be any network-connectable device that can receive sensor data, such as from the electronic sensor devices 106A-C, and can communicate with one or more of the authentication requesting devices 104A-B. An example electronic device 102 is discussed further below with respect to FIG. 2. In one or more implementations, the electronic device 102 may include a secure element for storing user biometric information, profiles, models, etc. The electronic device 102 may use the information stored in the secure element to facilitate user authentication, as is discussed further below with respect to FIGS. 4-6.

The electronic sensor device 106A is depicted in FIG. 1 as a smart watch, the electronic sensor device 106B is depicted in FIG. 1 as smart glasses, and the electronic sensor device 106C is depicted in FIG. 1 as an arm band device. However, the electronic sensor devices 106A-C may be any devices that can obtain, or sense, information regarding a user, such as biometric information, user activity information, user images, etc. For example, the electronic devices 106A-C may include network camera devices, home security devices, heart rate monitoring devices, implanted and/or implantable devices, wearable devices, activity monitoring devices, blood flow monitoring devices, sleep monitoring devices, or generally any device that can provide information that may be used to identify a user. In one or more implementations, one or more of the electronic sensor devices 106A-C may include at least one processor circuit that can perform one or more processing tasks. In one or more implementations, one or more of the electronic sensor devices 106A-C, such as the electronic sensor device 106A, may include a secure element for storing user biometric information, profiles, models, etc., e.g. in lieu or and/or in addition to, the electronic device 102. An example electronic sensor device 106A that includes a secure element is discussed further below with respect to FIG. 3.

The authentication requesting devices 104A-B may be devices that are proximal or remote to the electronic device 102, and that request for user authentication, and/or facilitation thereof, by the electronic device 102. The authentication requesting device 104B is depicted in FIG. 1 as a remote device, such as a remote server, and the authentication requesting device 104A is depicted in FIG. 1 as a proximal device, such as a point-of-sale terminal. However, the authentication requesting devices 104A-B may be any devices that can request for user authentication, and/or facilitation thereof, by the electronic device 102, such as via the network 108 and/or via a direct connection.

The authentication server 110 may be a server device that may operate, in one or more implementations, in conjunction with the electronic device 102 to provide for user authentication and/or facilitation thereof. For example, the authentication server 110 may include a central database 112 that securely stores user biometric information, profiles, models, etc., e.g. in lieu or and/or in addition to, the electronic device 102. In one or more implementations, one or more of the electronic device 102, the authentication requesting devices 104A-B, the electronic sensor devices 106A-C, and/or the authentication server 110, may be, and/or may include all or part of, the electronic system illustrated in FIG. 7.

In one or more implementations, the network 108 may include a gateway device (not shown) that facilitates communications of the electronic device 102, the electronic sensor devices 106A-C, the authentication requesting device 104B, and/or the authentication server 110. The gateway device may function as an intermediary between one or more of the authentication requesting device 104B, the authentication server 110, the electronic device 102 and/or the electronic sensor devices 106A-C. In one or more implementations, the electronic device 102 may operate in conjunction with the gateway device to facilitate providing user and device authentication information to the authentication requesting device 104B and/or to facilitate receiving user and device authentication from the authentication server 110.

In one or more implementations, the network environment 100 may be a secure network environment that includes one or more levels of centralization, such as combining one or more functions performed in the network environment 100. A first level of centralization may include device authentication, e.g. authentication of the electronic sensor devices 106A-C and/or the electronic device 102, and/or association of authenticated devices with one or more owners, wearers, operators of the devices, etc. In one or more implementations, the electronic sensor devices 106A-C may be registered with a device identifier and/or associated with a user via the authentication server 110. For example, a device identifier may be associated with a user via a one-time password (OTP) security mechanism that is programmed during and/or after the device is manufactured. In one or more implementations, a device identifier may include a serial number (e.g., 64-bit number).

In one or more implementations, the first level of centralization may support automatic configuration of the authenticated devices 106A-C based on a current authenticated user. The first level of centralization may further support authorizations for devices and cloud based operations and services, selective delivery of address and status information, and/or second and third level collections and services. In one or more implementations, the first level of centralization may offer different capabilities on the electronic sensor devices 106A-C, the electronic device 102, and/or central services provided by the authentication server 110 and/or or servers coupled to the network 108, depending on the particular owner and/or user that is wearing and/or carrying the electronic sensor devices 106A-C and/or the electronic device 102.

In one or more implementations, a second level of centralization may include supporting user authentication and/or storing associated authentication information. A root identity of the user may be created and/or stored in the central database 112 of the authentication server 110. In one or more implementations, the user's personal biometric identifying information may be securely stored in the central database 112, e.g. for servicing authentication challenges. Challenges may include, for example, receipt of biometric information (e.g., iris image) along with a unique user identifier (e.g., a unique user handle such as an email address), comparing what is securely stored with the iris image, and/or delivering a level of matching confirmation. The second level of centralization may deliver the iris data to another system to support a local challenge, and security may be maintained. In one or more implementations, the user's personal biometric identifying information may need to be collected from a secure source such as the Department of Motor Vehicles (DMV), the Passport Agency and/or an employer's employee database.

In one or more implementations, the authentication server 110 may pair together different types of biometric identifiers and match the biometric identifiers, or groupings thereof, to one or more keys, or level of keys, that are available to the user. A user may have a public key stored in the central database 112 and a private key stored on the electronic sensor devices 106A-C and/or the electronic device 102, such as a mobile device. In one or more implementations, biometric identifiers of the user may be used as part of an OTP security mechanism. For example, a user may provide a password and a fingerprint, and if the password is authenticated the fingerprint may be burned into an OTP.

In one or more implementations, the authentication server 110 and/or the central database 112 may be cloud-based and/or may cover all devices and/or all types of users. In one or more implementations, the authentication server 110 and/or the central database 112 may be configured at a smaller scale, e.g. local to a particular operator and/or a single home or enterprise. In one or more implementations, a user may log in to the authentication server 110 to add, delete and/or manage the user's personalized settings. For example, tags, such as stored in a database record, may be used to indicate the level of security required for transactions and the level of security associated with each tag may be configured by the user, e.g. by logging in to the authentication server 110.

In one or more implementations, the third level of centralization may include storing, delivering and/or providing access to services based on non-user-identifying information securely collected by one of the electronic sensor devices 106A-C, such as the electronic sensor device 106A, after the electronic sensor device 106A and an associated user have been authenticated using one or more of the first and second levels of centralization. The authentication server 110 may provide secure storage and services associated with other types of information and data collected by the authenticated electronic sensor device 106A. For example, medical information of the user might be collected, stored, serviced, and/or forwarded via the electronic sensor device 106A based on the user request and payment. For example, heart sensor data may be delivered, compressed, analyzed and summarized via the authentication server 110 and/or a third party server before forwarding excerpts of the resulting output to a registered doctor recipient's application or server and/or to the user via email. A user may log in the authentication server 110 to set up a service, e.g. medical information service, including agreeing to any associated fees of the service.

In one or more implementations, device identifiers of one or more of the electronic sensor devices 106A-C, such as the electronic sensor device 106A, may be registered to a user identifier, family identifier, and/or a group identifier via the authentication server 110. The electronic sensor device 106A may be paired with other devices, such as via charging pad pairing, radio frequency (RF) pairing, audio pairing, vibration pairing, light pairing, etc., using the authentication server 110 via device and user authentication (e.g., the first and second level of centralization). Possible pairing communication pathways and status related thereto may also be maintained via the authentication server 110. The user's biometric information, e.g. voice, fingerprint, tattoos, heart rate parameters, encephalogram waveforms, skin colorization, fingerprint, hand shape, etc., may be stored within one or more storage locations, including one or more of the electronic device 102, the electronic sensor devices 106A-C, and/or the authentication server 110. Within any of the storage locations, a user's biometric information may be associated with the identifiers (e.g., birth certificate identifiers) of the electronic sensor devices 106A-C and/or traditional login in and challenge information. The electronic sensor devices 106A-C may be securely and dynamically authenticated, and/or attached with other devices.

In one or more implementations, if someone other than the owning user, such as a thief, puts on one or more of the electronic sensor devices 106A-C of the user, such as the electronic sensor device 106A, before the electronic sensor device 106A would become fully functional, the biometric data collected by the electronic sensor device 106A may generate "amiss data" to indicate the another user, e.g. thief, who is wearing the electronic sensor device 106A may not be authenticated. When the another user holds the electronic sensor device 106A in a viewing orientation, the electronic sensor device 106A may capture a face image and/or forward the face image with the "amiss data" to the authentication server 110 for comparison with a previously captured face image of the owning user. The authentication server 110 may react by contacting the police, the owning user, etc.

In one or more implementations, when a user puts on one of the electronic sensor devices 106A-C, such as a blood pressure measuring arm band device, the arm band device may report, e.g. via a proximal mobile device, to the authentication server 110 that the arm band device has become active including its device identifier. The authentication server 110 may verify ownership and/or may record active status of the arm band device. The arm band device may collect biometric data from the user, and may forward, e.g. via the proximal mobile device, the collected biometric data to the authentication server 110 for central processing, storage and routing of the data (third level services). Upon detecting an abnormality, the authentication server 110 may forward the collected biometric data to a device of a doctor, which may require both the device and the doctor to authenticate via a second level interaction. In one or more implementations, the doctor may also access the processed and/or raw biometric data via a secure website interaction, e.g. when second level centralization is provided.

In one or more implementations, the network environment 100 may be a secure network environment including one or more local security mechanisms. In one or more implementations, biometric information can be used to securely gain ownership of a device, such as the electronic device 102, and/or one or more of the electronic sensor devices 106A-C, through one or more steps that may be performed by the authentication server 110 and/or the electronic device 102. A first step may involve an observation and/or collection of biometric data, such as by the one or more electronic sensor devices 106A-C. In one or more implementations, the one or more sensor devices 106A-C may vary between modalities, to facilitate the observation. A second step may convert and/or describe the observed biometric data, via for example, a digital representation called a template. The second step may also vary between modalities and devices. In a third step, the newly acquired template may be compared with one or more previously generated templates stored in a database, such as the central database 112 of the authentication server 110. The result of the comparison may be an indication of a match and used for permitting access. Alternatively or in addition, the result of the comparison may be an indication of a non-match and used for sounding an alarm, etc. The one or more steps may be repeated multiple times before locking down the templates and/or declaring ownership. In one or more implementations, a secure password may be used to lock down the owned device. For normal access after the initialization of the device, the steps may be performed without the third step.

In one or more implementations, one or more local security mechanisms may be securely added to the electronic sensor devices 106A-C and/or the electronic device 102, such as to locally protect personal biometric and/or identity information without having to share the biometric information with the authentication server 110.

In one or more implementations, the electronic sensor devices 106A-C may capture the user's biometric information, user's behaviors and/or sense surrounding environmental information after activation and/or initialization. For example, the electronic sensor device 106A, such as in the form of a smart watch device, may capture motions associated with the user (e.g., vibration, acceleration), biometric feedback (e.g., unique heart T-wave), geographic location, visual information (e.g., face or iris of the user or skin), audio information (e.g., via voice sampling). In one or more implementations, the information collected by the electronic sensor device 106A may periodically establish a baseline for the authentication of the user. The user may be a user wearing and/or carrying the electronic sensor device 106A.

In one or more implementations, the electronic sensor devices 106A-C and/or the electronic device 102 may securely store the information collected by the electronic sensor devices 106A-C within a local secure memory for future confirmation of user authentication. For example, the electronic device 102 may securely store the information collected by the electronic sensor devices 106A-C within a local secure memory without sending the information to a central database in the network 108 and/or the authentication server 110

In one or more implementations, the electronic sensor devices 106A-C may be secure tamper-resistant devices that can be challenged for device authentication, which if passed can be trusted to deliver only a user authentication conclusion without forwarding the collected user authentication data. In one or more implementations, if an incoming secure communication contains other-sourced collections of authentication data, the electronic sensor devices 106A-C may respond by verifying the same against the data that has been collected.

For example, the electronic device 102, in the form of a mobile device, may collect fingerprint data via user interaction with the screen of the electronic device 102. The fingerprint data may be encoded and stored in secure memory of the electronic device 102. A user authentication may be requested by an authentication requesting device 104A, such as in the form of banking equipment, when the user initiates a banking transaction. A banking application running on the electronic device 102 may interact with the authentication requesting device 104A to assist with user authentication. In one or more implementations, the authentication requesting device 104A may collect a fingerprint of the user without storing the fingerprint. The authentication requesting device 104A may encode the fingerprint and deliver the encoded fingerprint to a banking application running on the electronic device 102 for confirmation. In one or more implementations, the authentication requesting device 104A may include a wireless local fingerprint reader with no upstream access for sending the fingerprint data. The electronic device 102 may interact with the wireless local fingerprint reader via a secure direct communication, such as via NFC. The bank's authentication requesting device 104A may only provide the bank's server with a confirmation or confirmation level number received from the banking application on the electronic device 102. The banking application on the electronic device 102 may not store the fingerprint reader information received from the authentication requesting device 104A, and may not have access to the secure fingerprint data collected by the electronic device 102.

In one or more implementations, the network environment 100 may be a secure network environment including one or more local networks, such as personal area network (PAN) including the electronic device 102 and/or the electronic sensor devices 106A-C. One of the electronic sensor devices 106A-C may participate to satisfy a single user authentication request, and/or multiple electronic sensor devices 106A-C may participate together, e.g. with the support of the electronic device 102 and/or a gateway device.

In one or more implementations, the one or more local networks can provide the electronic device 102 with information for continuous security assessment and/or rating of the user and device authentications. For example, the electronic sensor devices 106A-C may gather sensor data continuously and/or or periodically that can be used in an ongoing security assessment. The security assessment and/or rating may include biometric type contributions, aging (e.g., delay since recent challenge/measurement), cross-contribution likelihoods, geographic location, historical behaviors, new versus old devices within the PAN grouping, etc.

For example, a user's heart rate versus time of day, day of week or activity related level (e.g., impact indicating jogging or lack thereof indicating at rest and at a measured body temperature) collected from the electronic sensor device 106C, can indicate that a measurement falls within a positive range that may factor in in verifying that the user is wearing the electronic sensor device 106C. Alternatively or in addition, the electronic sensor device 106B may recognize the user's hands versus those of another user and/or examine the user's iris, to further buttress the verification. The electronic device 102 may divert an image during a voice call to recognize the user's image and/or audio for analysis to determine whether the user is speaking. In one or more implementations, one or more of the electronic device 102 and/or the electronic sensor devices 106A-C can contribute to the verification of the user's identity.

In one or more implementations, based on data aging and/or device removal detection events, an overall verification rating of the user may be established that may change over time. If the verification rating drops below a certain rating a further challenge may be triggered by a security management infrastructure (e.g., circuitry/software) running on the electronic device 102, the electronic sensor devices 106A-C, and/or the authentication server 110.

In one or more implementations, a service may require a first security level to initially access the service and/or associated content, and/or a second security level to maintain access to the service and/or content, where the second security level may be higher or lower than the first security level. In one or more implementations, depending at least in part on a number of the electronic sensor devices 106A-C contributing data, and/or the nature and frequency of the contributions, direct user challenges in more traditional manners may also be used (e.g., password/logins manually or identifying mother's maiden name).

In one or more implementations, biometric data and/or recognition and matching related thereto may include heart rate, skin colorization, vein patterns, vibration patterns (e.g., finger contact), face, fingerprint, DNA, hand, keystroke, signature, voice, etc. In one or more implementations, adaptive security level requirements may be used, e.g. delaying a challenge based at least in part on the range of operation used, hash fingerprinting with initial and/or challenge lock down via typed and/or verbal password, and the like. In one or more implementations, user authentication may use heart rate, timing and/or wave characteristics, oxygen level, interconnect via tissue, common audio, common body movement like tap or motion, and/or implantable identifier device. In one or more implementations, multiple identification mechanisms may be combined, based at least on the information available from the electronic sensor devices 106A-C, to identify a user and/or grant access. In one or more implementations, a service may grant access to the authentication requesting devices 104A-B when the confidence level of user authentication is above some threshold, e.g. if confidence is >95%, grant automatic access to an online streaming service without requesting user log in and/or authentication challenges.

In one or more implementations, a trusted hardware and/or software element may be included in the electronic device 102 to manage confidence and/or security levels. In one or more implementations, the electronic sensor devices 106A-C may mimic natural ownership behaviors. For example, the electronic sensor device 106B may capture an image of a smart watch, e.g. the electronic sensor device 106A, being worn by the user and may attempt to visually match the smart watch with stored images of smart watches previously worn by the user. If the electronic sensor device 106B cannot authenticate the user with a certain confidence level, the electronic sensor device 106B may query the smart watch to determine whether the smart watch is storing any information associated with the user.

In one or more implementations, different levels of security and/or privacy may be associated with different devices, such as the electronic sensor devices 106A-C and/or the electronic device 102. In one or more implementations, the electronic sensor devices 106A-C and/or the electronic device 102 may provide authentication for many different daily micro transactions that may require significantly less security than other transactions, such as banking transactions. Thus, for the daily micro transactions the electronic device 102 may use the user's known and/or learned behavioral patterns, e.g. as determined by the electronic sensor devices 106A-C, as part of the user authentication scheme.

In one or more implementations, a biometric authentication system operating on the authentication server 110 and/or the electronic device 102 may tie together multiple biometric identifiers to increase the confidence of the identity of the user being authenticated. The system may provide a user's public key to any system/device, and the system/device may obtain the user's biometric information to match to the public key.

In one or more implementations, the electronic sensor devices 106A-C and/or the electronic device 102 may be used as card replacements for automated teller machines (ATM). For example, the electronic sensor devices 106A-C and/or the electronic device 102 may communicate an identity of a user to an authentication requesting device 104B of a bank, e.g. based on biometric identifiers, but the user still may be required to enter a pin or provide some other form of authentication to the authentication requesting device 104B. In one or more implementations, the electronic sensor devices 106A-C and/or the electronic device 102 may communicate an identity of a user and credit card information for the user, e.g. to an authentication requesting device 104B of a store, but the store may still use some form of in-person verification, when the user makes a purchase at a store.

In one or more implementations, a biometrics based authentication system operating on the authentication server 110 and/or the electronic device 102 may have different levels of confidence (e.g., with respect to a user's identity) based on the access that the user is requesting. For example, a smaller level of confidence may be required for a video streaming system than for a banking system. A combination of any number of biometric variables may be used to determine the level of confidence. In one or more implementations, user's behavior and/or behavior history including geographic location may be part of the authentication mechanism, e.g. a user may always wear a watch, may never wear a ring, etc.

Figure 2:
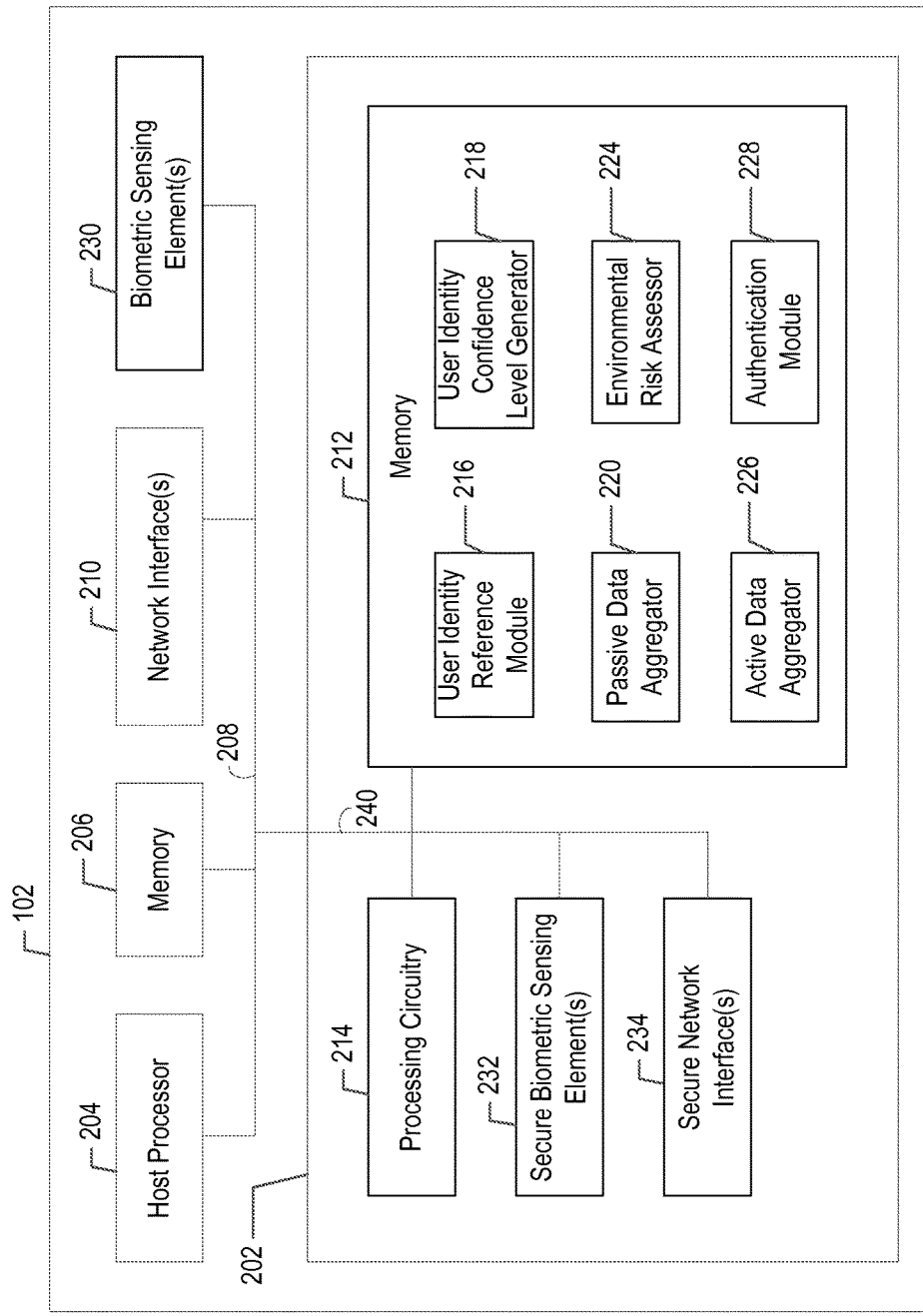
FIG. 2 illustrates an example electronic device that supports adaptive biometric and environmental authentication in accordance with one or more implementations.

FIG. 2 illustrates an example electronic device 102 that participates in authentication processing based on biometric and environmental data in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example electronic device 102 includes a secure element 202, a host processor 204, a memory 206, a bus 208, one or more biometric sensing elements 230 and one or more network interfaces 210. The secure element 202 includes a memory 212, processing circuitry 214, one or more secure biometric sensing elements 232, one or more secure network interfaces 234 and a bus 240. Memory 212 includes a user identity reference module 216, a user identity confidence level generator module 218, a passive data aggregator module 220, an environmental risk assessor module 224, an active data aggregator module 226, and an authentication module 228. The memory 206 may be any memory, such as dynamic random-access memory (DRAM). The memory 212 may be a non-volatile memory such as a flash memory, a read-only memory (ROM), and/or a battery-backed random-access memory (RAM). In one or more implementations, one or more of the user identity reference module 216, the user identity confidence level generator module 218, the passive data aggregator module 220, the environmental risk assessor module 224, the active data aggregator module 226, and/or the authentication module 228 is implemented by one or more circuits external to the memory 206.

The secure element 202 may be fully built in and not removable, or, all or a portion thereof, may be easily inserted and removed from the electronic device 102 via a mechanical engagement (hereinafter "docked"). Once engaged, electrical signaling and interconnection may be wired or wireless. For example, the secure element 202 may take on a thumb drive-like form factor which may be docked with an authentication challenger's system or device. For example, by docking at a bank, a user might provide bio capture data via bank systems into the secure element 202 with or without copies being made within the bank's infrastructure. If made, such copies can be encrypted in a manner that the bank never gains bio-data access by using key based encryption on the copy which supports future bank-system-side comparisons to corresponding future, encrypted bio-data captures.

To further support such authentication processing security, the secure element 202 is illustrated as comprising fully separate hardware from that of the less-secure host portion (i.e., the host processor 204, memory 206, network interfaces 210, and biometric sensing elements 230) of the electronic device 102. In alternate implementations, all or portions of the secure element 202 can be combined with that of the host portion. Therein security through bifurcation can be carried out in whole or in part via secure software partitioning, e.g., secure plus open OS's.

In one or more implementations, the electronic device 102 may establish a direct or indirect network connection with one or more of the authentication requesting devices 104A-B and/or the electronic sensor devices 106A-C via one or more of the network interfaces 210 and 234. The network interfaces 210 and secure network interfaces 234 may each include, e.g., a Bluetooth network interface, NFC network interface, a Wi-Fi Direct network interface, a ZigBee network interface, a ZigBee Pro network interface, skin and body pathway linkages, tethers and the like. Each of the interfaces 210 and 234 may carry a link specific negative authentication contribution. That is, communication links can exhibit varying levels of security which are factored into the overall authentication ratings. Such links can be point to point or via one or more intermediate forwarding or routing nodes that can be similarly factored in independently or via a single linkage contribution.

The electronic device 102 collects a plurality of different types of bio-data (i) via secure biometric sensing elements 232 and open biometric sensing elements 230, and (ii) from wearables and other devices via secure network interfaces 234 and the open network interfaces 210. For example, fingerprint data might be collected from a user's normal touch interaction with the screen of the electronic device 102. Iris, lips, face, finger, hand, ear, etc., images might be captured by one or more imagers that comprise a portion of the biometric sensing elements 230—in this case, elements can be used for both bio-sensing and non-bio related data collection. Similarly, a glucose sensing element or assembly might comprise a portion of the secure biometric sensing elements 232. Worn sensor devices may collect and deliver (via the open or secure network interfaces 210 and 234) heart rate, ear canal, brain related signaling, medical information, and other types bio-data. All such types of bio-data may be encoded and stored in either or both of the open memory 206 and the secure memory 212 of the electronic device 102.

Upon collection or upon storage, such bio-data is stored in time relationships with other bio-data. For example, all bio-data and/or bio-data samples may include time stamping or may be stored in a relationship that indicates the time or sequence of capture or storage. Open and secure clocking elements (not shown) can be used in this process which may also involve a clock synchronization across all electronic devices and wearables. Alternatively, bio-data of all types may be processed as it is collected or received, in sequence, which inherently services time correlation.

Environmental data is similarly captured and processed. Various types of environmental sensors and circuitry (neither shown) can collect vibration, ambient temperature, acceleration, motion, impacts, inactivity, sunlight, orientation, direction, relative and absolute locations and so on. Such sensors and circuitry may be embedded within the electronic device 102 or carried within other user devices, wearables or network devices that communicate underlying environmental data via the network interfaces 210 and 234. Environmental data also includes interaction data of the user with the electronic device 102 and other wearables and remote devices. For example, App usage and user input data and logs, home appliance operational modes and user interactions, etc., are collected. Other types of environmental data may be received from Internet and intranet sources, e.g., a weather forecast or geographic region identification. As with bio-sensor data, the environmental data can be stored within the memory 206 and 212 in a time or sequence identifying manner (e.g., with time stamping).

Initially and over time, all locally and remotely collected bio-sensing and environmental data is used to establish base-line data that can be used to assist in a process of authenticating an identity of an underlying user and the underlying device or wearable (i.e., both device and user authentication). For example, oft repeating prior location data, user's device interactions, blood pressure, heart rate, iris image, finger shapes, etc., all occur at a particular time of day and day of the week. Later, on such day and time, collected bio and environmental data is collected and compared with the repeated prior collections. Close matches resulting from such comparisons each contribute positively to one or more authentication ratings which, in turn, might be sufficient for an online checkout process. That is, if a rating is high enough as determined by the processor and/or the user (through pre-configurations), such authentication rating can trigger a sales completion. If not, a rating insufficiency message can be delivered to the electronic device 102 to request an automatic or user assisted upgrade. To upgrade automatically, for example, the electronic device 102 might capture a photo of the user's iris in the background, compare it with photos of the user's iris that were previously captured and stored in the memory 212 and find very high correlation. Because of the time of capture (near-term) and high correlation, a new and even higher authentication rating might be achieved. One or more other sensor data captures and timely comparisons might also be engaged automatically and in background to drive the rating up further as needed—need based on rating requirement definition within the rating insufficiency message. In addition to triggering a single real-time collection, bio and environmental collection frequency or sampling can also be adjusted up (or down) as needed to meet and hold a requirement.

Alternatively or in addition, the user may also be prompted to participate to raise a rating. For example, the user may be prompted to place a finger in a glucose and pulse reading device or be required to enter voice or text passwords that can be processed locally within the electronic device 102 or forwarded on via the network interfaces 210 or 234 to and to satisfy the online checkout processor.

In other words, a cloud service, server, Internet portal, printer, wearable, network device, or any other remote device or service may challenge authenticity of one or both of the electronic device 102 and the underlying user. Further challenge depth can also extend to all other devices, such as wearables, network and user devices, that provide bio or environmental data to support authentication ratings. To accomplish this, all such other devices can receive all or portions of the circuitry and elements illustrated in FIG. 2. Thus, as a user/wearer picks up a cell phone, dons a health bracelet, inserts an earpiece, etc., each new device can challenge and be challenged by any one or more other devices currently in service. In this way, an overall security level can be established via the group via past underlying bio and environmental data collections as compared to current collections. Of course, other security challenge mechanisms regarding key exchanges amongst device participants can also be layered therein.

Starting with a single device such as the electronic device 102, a user may add in many other devices over time that participate in both, or either, device and user authentication. Likewise, over time, some devices may be turned off, fall out of range, or otherwise become inactive as an authentication group rating participant. Others may join in at other times, often as a user wanders and decides which devices are needed. A user may also don or remove one or more devices to enhance their own or another device's authentication rating. Doing so may be triggered by a (pop-up) request constructed based on (i) a message or requirement received from a challenging device or service; or (ii) the user's or device's own preset configured secure authentication requirements. Similarly, if only a much lower authentication rating is expected or needed, a user or the electronic device 102 may disable, disassociate or adjust bio/environmental collection rates downward to ease power and resource needs.

With automatic (e.g. in the background) and user assisted authentication management, a device's authentication and a user's authentication can be established before and throughout a secure session. Thus, a user and any device/system (i.e., pc, tablet, phone, wearable, network element, cloud or hosted systems or service, etc.) can define (i) a first authentication rating threshold before initiating a service or interaction, (ii) a post initiation second authentication rating threshold that must be maintained during the session, (iii) periodic mid-session heightened third authentication threshold challenges, and (iv) a session termination fourth authentication threshold challenge. Such thresholds may be the same or differ substantially. Some may require user interaction and others may require authentication rating adaptation through message exchange with an underlying device/system. Such requirements for meeting authentication (user authentication and authentication for each underlying device/system), can be distributed through messaging, with software elements (e.g., Apps, OS's), or otherwise within configuration data stored, established or exchanged.

Adaptive authentication requirements can be managed through commands and messages exchanged between the challenging system, service or device to the electronic device 102 (or to other devices supporting underlying bio and environmental data collection). Such commands and messages received by the electronic device 102 may be forwarded to such other bio and environmental devices as needed to carry out adaptation (e.g., causing an immediate capture or altering a sampling rate or configuration). These commands and messages can be automatically generated or involve user or service personnel interaction. For example, a banker offering online banking may interact via a banking computer to cause an authentication related event, such as a one-time threshold check process involving audio playback to the user of a question while a brain signal pattern, sweat, and/or heart rate data is being sampled.

Likewise, a user may interact to trigger (or any of the user's devices may automatically trigger) a one-time reverse authentication process, i.e., an authentication of a cloud service, system and the banker, to make sure they are not being scammed. Therefore, the cloud service, hosting and other systems (although not shown) may similarly be configured with some or all of the circuitry and elements illustrated within the electronic device 102. In this way, their authentication and the authentication of the banker (human) can similarly receive challenges and can deliver reverse authentication rating information to, for example, the electronic device 102 to satisfy initial, mid-session and session terminating authentication requirements of the user and user's devices and wearables.

Moreover, if for example a banker (or online banking service) does not trust a local device fingerprint comparison, the banker (or banker's system) could, through a secure network pathway, request a copy of the captured fingerprint data. Such data could be compared against that captured by the banker when face to face with the user at a banking facility. The banker could also appreciate a currently very high authentication rating to accept and store the fingerprint data for the first time within their online servicing system for such future comparisons.

An alternative that may satisfy the banker would be to have the user visit the banking facility while carrying their electronic device 102 and possibly other wearables. Then, more trustworthy authentication and reverse authentication interactions, along with bio-data capture can be made and stored for future comparisons within the secure element 202 (within the memory 212). In this way, through key based challenges, the validity of a future fingerprint data match made by the secure element 202 (or any other device-side device authentication and/or user authentication) can be trusted (to a certain level of authentication) by the banking system, and the user and user devices can trust (to a certain level of authentication) a bank-side re-authentication process (banker, systems, services).

A user can accept pre-configured or otherwise pre-defined reverse authentication requirements (e.g., initial, periodic, ending and mid-session thresholds) that challenge a particular system, service and associated other users or management personnel. Such reverse authentication requirements can thereafter be implemented automatically whenever the challenge is needed, but the user can still inject themselves into the process when they believe further or heightened scrutiny is needed. For some systems, services and personnel, a user (or their underlying bio and environmental collection and authentication processing devices) may not require reverse authentication. For some users and underlying collection and processing devices, some systems, services and personnel may not need (forward or normal) authentication. Thus, such authentication may be one way or bi-directional. It may be per fixed definition in one direction or both, and adaptively defined otherwise. Also, in either direction, adaptation may be user triggered and/or automatic. A user may also require a higher level of authentication for a challenger than the challenger requires through preset configurations.

Different devices, systems and services may have more or less reliable authentication, bio and/or environmental data than others. For example, a phone which captures finger shape, touch, lip, device grasp, fingerprint, voice, iris and face data might be able to provide higher authentication rating contributions than that of a worn heart rate monitor. Even so, the heart rate monitor still provides a contribution. Likewise, location, user interaction, and other environmental data may offer a lesser contribution, especially when less secure hardware systems are involved. But, overall, one or more authentication ratings for a user and one or more for each piece of underlying equipment (devices, systems, services and networks) involved in the authentication (and reverse authentication) process are generated. These user authentication ratings and equipment ratings can also be combined. In addition, the underlying rating data may be communicated to the challenging equipment for local processing and combination, instead of or in addition to the challenged equipment doing so in advance of sending the resulting ratings.

There are various ways to represent authentication ratings. One rating for a user may involve a first device's maximum and minimum trustworthiness factor weighed against such device's level of bio and/or environmental correlation with known valid or prior collected averages and statistical ranges. A device, system or service's "trustworthiness" may be broken down further based on how secure and how recent bio-data is collected or received, processed and communicated. This also involves the security associated with the receipt and sending communication linkages, the sending device's associated security and trustworthiness, underlying susceptibility of bio and environmental data capture trickery, and correlation value. Correlation value as used herein means that when the bio or environmental data seem to correlate well, how much evidence does it provide that the person is who they are expected to be. For example, many humans have blue and brown eyes. A sensor collecting a blue eye image should indicate a serious failure to authenticate a brown-eyed viewer. But a brown eyed image only add a modest amount of authentication contribution. A better imaging sensor might reveal iris patterning, and when patterns match, the authentication contribution (i.e., the correlation value) would be much higher.

As a group, many small pieces of otherwise modest authentication contribution can add up to provide an acceptable authentication level for a challenger. If it consists entirely of modest contributions, an automatic challenge threshold that requires user interaction might be injected into the process. If the rating involves a major contributor, such inserted challenge may not be required. Likewise, ratings might also be broken into positive authentication ratings and negative authentication ratings, wherein each contribution carries with it a likelihood that the authentication is correct and a separate likelihood that the authentication is false, Correct and false authentication ratings can be defined independently for (a) each device, (b) a bio group of all bio-data contributing devices, (c) an environmental group of all environmental data contributing devices, (d) an entire group of all contributing devices, (e) any of the above combined with the user's authentication ratings, and/or (f) the user alone. Also, as mentioned previously, raw data and partially processed data along with authentication rating processing information can be communicated with user authorization (real time or via preset configurations) to the challenger. This rating categorization applies to reverse authentication as well.

In particular, in one or more implementations illustrated by FIG. 2, the processing circuitry 214 operates in accordance with various program code elements or modules 216, 218, 220, 224, 226 and 228 stored within the memory 212. The user identity reference module 216 may direct the processing circuitry 214 to maintain user identification items stored in the memory 212. One or more of the user identification items may at least partially identify a reference user, e.g. the user who owns the electronic device 102. The user identification items may include, for example, a facial image of the reference user, an activity profile of the reference user, a motion profile of the reference user, a location profile of the reference user, a heart rate profile of the reference user, a hand image of the reference user, an iris image of the reference user, and/or any other actively or passively obtainable time-varying or time-constant biometric data corresponding to the reference user. In one or more implementations, passively obtainable biometric data may refer to biometric data that can be obtained passively, e.g. without conscious user input and/or feedback, while actively obtainable biometric data may refer to biometric data that is obtained actively, e.g. with conscious user input and/or feedback. In one or more implementations, some biometric data may be both actively and passively obtainable, such as fingerprint may be passively obtainable when a user is holding the electronic device 102 and may be actively obtainable by requesting the user to perform a fingerprint scan. In one or more implementations, time-varying biometric data refers to biometric data that varies over time, such biometric data that varies on a yearly basis, a daily basis, an hourly basis, a minute basis, a second basis, or more frequently.

In one or more implementations, profile data, such as location profile, activity profile, heart rate profile, motion profile etc., may refer to a set of data collected over a period of time, such as an hour, a day, a week, a month, etc. For example, a heart rate profile may include heart rate data collected over a period of time, while a motion profile may include motion data, such as accelerometer data, collected over a period of time. Thus, in one or more implementations, the heart rate profile for a period of time may be cross-referenced against the motion profile over the same period of time, e.g. to determine the reference user's heart rate while running, walking, sleeping, etc.

In one or more implementations, the user identity reference module 216 may also direct the processing circuitry 214 to maintain and/or generate a biometric predictive model for the reference user that is stored in the memory 212. The biometric predictive model may be generated using historical biometric data collected from the reference user and one or more environmental variables and/or environmental attributes collected with the biometric data, as is discussed further below with respect to FIG. 4. The biometric predictive model may be used to generate predicted biometric data for the reference user, which may be compared against current biometric data collected from the user wearing the electronic sensor devices 106A-C, e.g. to determine a confidence that the user wearing the electronic sensor devices 106A-C is the reference user.

In one or more implementations, the memory 212 may also store additional data, such as trusted baseline biometric reference data, ongoing historical biometric data captures, statistical summaries with the associated capture period trust rating and/or timestamps associated with the biometric data. The identification information may include configuration information associated with the electronic sensor devices 106A-C, such as capture/sensing element configurations of the electronic sensor devices 106A-C, manufacture base security, authentication ranges based on operating mode, the device borrower histories and resulting security contribution ranges and/or other similar settings. The identification information may also include personalization information, such as user settings and/or access controls associated with websites, applications, social groups, device access, device authentication and security rating requested with the user setting, and/or any enhancements associated with the user setting.

The passive data aggregator module 220 may direct the processing circuitry 214 to receive and/or aggregate data items, such as biometric data items, that are passively collected by one or more of the electronic sensor devices 106A-C and/or sensors that are part of the electronic device 102. One or more of the passively collected data items may include metadata that is indicative location information and/or time information associated with the corresponding electronic sensor device 106A. In one or more implementations, the data items that are collected and/or received by the passive data aggregator module 220 may include an image capture of the user, e.g. an image capture of a face, iris, hand, arm, ear, hair, body, skin, finger and/or fingerprints, a biometric capture of the user, e.g. a capture of the skin, tissue, implant interactions, electrocardiogram, moistures, blood pressure, activity and/or glucose, a tactile capture, e.g., pressure, finger, touch screen, speed, hand, grip, ring, band and/or shake, an audio capture of the user, e.g., a capture of user voice, voice of the user family, voice, tone, coughs, swallow, nose, environmental sounds and/or noises. In one or more implementations, the passive data aggregator module 220 may also receive and/or collect other miscellaneous captures, such as a capture of data pertaining to the nervous system, an ear chamber, temperature, location, and/or on/offline interactions with other users, devices and servers.

The user identity confidence level generator module 218 may direct the processing circuitry 214 to generate a user identity confidence level that indicates a confidence that the user in proximity to the at least one device, such as the one or more electronic sensor devices 106A-C, is the reference user. In one or more implementations, the user identity confidence level generator module 218 may direct the processing circuitry 214 to compare data items passively collected by the electronic sensor devices 106A-C to user identification items maintained as defined by the user identity reference module 216 to determine the user identity confidence level. The user identity confidence level generator module 218 may direct the processing circuitry 214 to continuously update the user identity confidence level, e.g. as additional passively or actively collected data items are received that are comparable to the user identification items.

In one or more implementations, the user identity confidence level generator module 218 may direct the processing circuitry 214 to weigh the comparisons of the passively collected data items to user identification items based on the amount that the user identification items identify the reference user. For example, a user identification item that includes a fingerprint may be more indicative of the identity of the reference user than a user identification item that includes a skin color. Thus, the outcome of a comparison of a passively collected data item to the user identification item that includes the fingerprint may be weighted higher (positively or negatively, depending on the outcome) than the outcome of a comparison of a passively collected data item to the user identification item that includes a skin color.

In one or more implementations, the user identity confidence level generator module 218 may direct the processing circuitry 214 to request predicted biometric data for the reference user from the user identity reference module 216 and may compare the predicted values to current biometric data collected by the electronic sensor devices 106A-C to determine and/or update the user identity confidence level.

The environmental risk assessor module 224 may direct the processing circuitry 214 to determine a risk level of an environment associated with the user, such as based on location information and/or time information determinable from the passively collected data items. The environmental risk assessor module 224 may direct the processing circuitry 214 to continuously update the risk level as the additional passively collected data items are received. In one or more implementations, the environmental risk assessor module 224 may analyze device security information, e.g., theft, temper, hack, and detect elements and/or sensor processes, to update the risk level. In one or more implementations, the risk level may be used to determine and/or to weight the user identity threshold.

The authentication module 228 may direct the processing circuitry 214 to facilitate user authentication based at least in part on the user identity confidence level (e.g., as directed by the user identity confidence level generator module 218). For example, the authentication module 228 may direct the processing circuitry 214 to receive a request from one of the authentication requesting devices 104A-B for authentication of the reference user, such as to authenticate with an online service, to authenticate with a point-of-sale terminal, etc. In one or more implementations, the request may include a user identity threshold that indicates a minimum confidence level of the user's identity that is required for successful authentication for the transaction. For example, a bank may request a higher confidence level than a video streaming service. If the request includes a user identity threshold, the authentication module 228 may compare the threshold based at least in part on the current risk level. If the request does not include a user identity threshold, the authentication module 228 may determine a user identity threshold based at least in part on the current risk level based on different environments. For example, the threshold may linearly scale with the risk level such that when the risk level is high, the threshold is high, and when the risk level is low, the threshold is low. In one or more implementations, the user identity threshold may be referred to as a match threshold, and the user identity confidence level may be referred to as the match level, such as when referencing the user biometric predictive model.

In one or more implementations, the authentication module 228 may direct the processing circuitry 214 to maintain a codebook that is stored in the memory 212. The codebook may map different user identity thresholds (and/or match thresholds) to different environments. Thus, when the environment in which the user is located is determinable, such as by the environmental risk assessor module 224, the corresponding user identity threshold is determined. The authentication module 228 may direct the processing circuitry 214 to retrieve the codebook from the memory 212 and may identify the appropriate user identity threshold based on the determined environment.

The authentication module 228 may direct the processing circuitry 214 to grant the authentication of the reference user when the user identity threshold is satisfied by the user identity confidence level, otherwise the authentication module 228 may direct the processing circuitry 214 to deny the authentication of the reference user. When the authentication module 228 directs the processing circuitry 214 to deny the authentication of the reference user, the active data aggregator module 226 may direct the processing circuitry 214 to actively collect an authentication data item from the user, such as by prompting the user. If the actively collected authentication data item causes the user identity confidence level to satisfy the user identity threshold, the authentication request may be granted. In one or more implementations, the active data aggregator module 226 may direct the processing circuitry 214 to automatically actively collect an authentication data item from the user when the user identity confidence level falls below a threshold, such as the most recently used user identity threshold.

The processing circuitry 214 may perform one or more additional processing tasks, such as performing rating degradations, upgrades, sampling and/or other adjustments associated with the biometric information stored in the memory 212. The processing circuitry 214 may process security alerts, may process authentication anomalies, and/or may perform tampering and/or hacking detections. The processing circuitry 214 may facilitate capture element configurations and/or adaptive performance management of the electronic sensor devices 106A-C. The processing circuitry 214 may perform encryptions and/or application programmable interface support for local and/or remote interactions.

In one or more implementations, one or more of the functions performed by one or more of the processing circuitry 214, such as those defined by the user identity reference module 216, the user identity confidence level generator module 218, the passive data aggregator module 220, the environmental risk assessor module 224, the active data aggregator module 226, and/or the authentication module 228, may be offloaded to the authentication server 110 or any other local or remote device, system or service. This can be done for authentication rating enhancement, to conserve processing or power resources, etc. Similarly, one or more of the data items stored in the memory 212 may be stored in the central database 112 of the authentication server 110 in raw, pre-processed or encrypted forms.

In one or more implementations, one or more of the secure element 202, the host processor 204, the memory 206, the bus 208, the one or more network interfaces 210, the memory 212, the processing circuitry 214, and the bus 240 may be implemented in software (e.g., subroutines and code). Similarly, any of software functionality defined by the modules 216, 218, 220, 224, 226 and 228 can be implemented in whole or in part in independent hardware, reducing the burden on the processing circuitry 214, In one or more implementations, one or more of the secure element 202, the host processor 204, the memory 206, the bus 208, the one or more network interfaces 210, the memory 212, the processing circuitry 214, the user identity reference module 216, the user identity confidence level generator module 218, the passive data aggregator module 220, the environmental risk assessor module 224, the active data aggregator module 226, the authentication module 228, and the bus 240 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
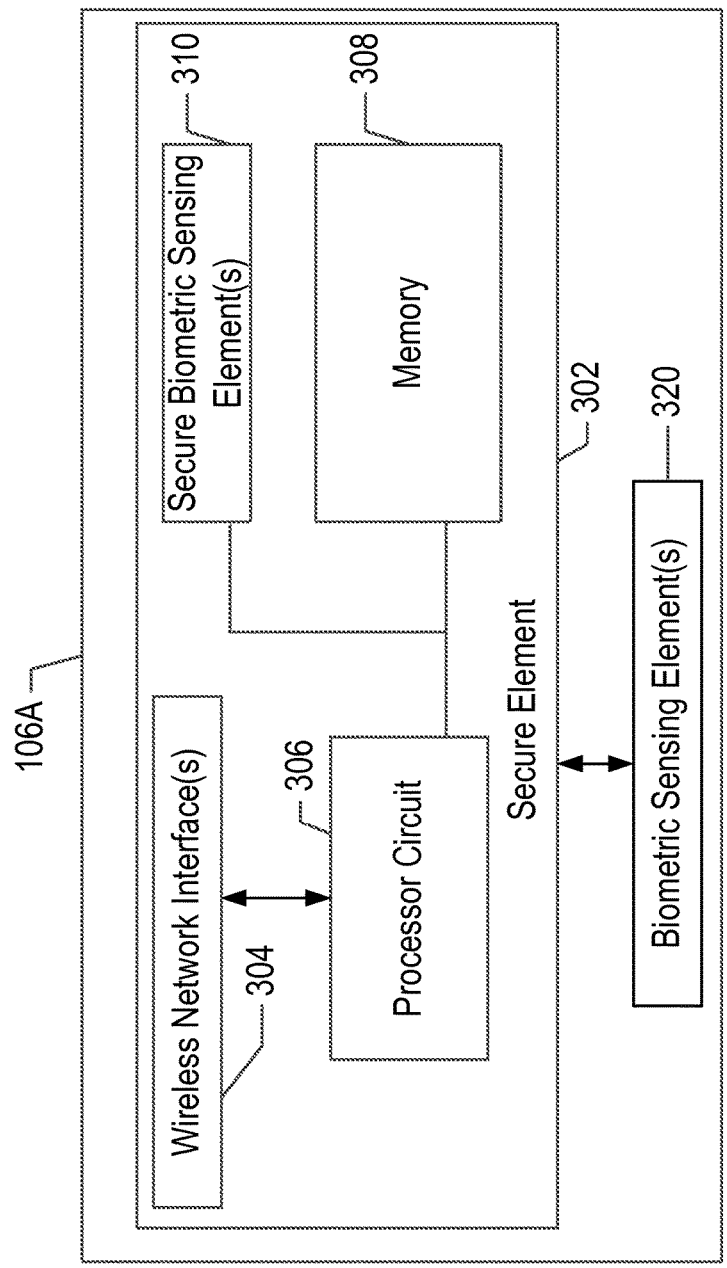
FIG. 3 illustrates an example electronic sensor device that supports adaptive biometric authentication in accordance with one or more implementations.

FIG. 3 illustrates an example electronic sensor device 106A that supports adaptive biometric authentication in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The electronic sensor device 106A includes a secure element 302 and one or more biometric sensing elements 320. In one or more implementations, the one or more biometric sensing elements 320 may perform the functions of one or more biometric sensing elements 230 in FIG. 2. The secure element 302 includes one or more wireless network interfaces 304, a processor circuit 306, one or more secure biometric sensing elements 310 and a memory 308. In one or more implementations, the processor circuit 306 may perform the functions of one or more of the user identity reference module 216, the user identity confidence level generator module 218, the passive data aggregator module 220, the environmental risk assessor module 224, the active data aggregator module 226, or the authentication module 228 of the secure element 202 in FIG. 2. In one or more implementations, the one or more secure biometric sensing elements 310 may perform the functions of one or more secure biometric sensing elements 232 in FIG. 2.

In one or more implementations, one or more the functions performed by one or more of the processor circuit 306, the user identity reference module 216, the user identity confidence level generator module 218, the passive data aggregator module 220, the environmental risk assessor module 224, the active data aggregator module 226, and/or the authentication module 228 may be offloaded to the authentication server 110, such as to conserve processing resources, etc. Similarly, one or more of the data items stored in the memory 308 may be stored in the central database 112 of the authentication server 110.

In one or more implementations, one or more of the secure element 302, the one or more wireless network interfaces 304, the processor circuit 306, or the memory 308 may be implemented in software (e.g., subroutines and code). In one or more implementations, one or more of the secure element 302, the one or more wireless network interfaces 304, the processor circuit 306, or the memory 308 may be implemented in hardware (e.g., an ASIC, a FPGA, a PLD, a controller, a state machine, gated logic, discrete hardware components, or any other suitable devices) and/or a combination of both. Additional features and functions of these modules according to various aspects of the subject technology are further described in the present disclosure.

Electronic sensor devices such as the electronic sensor device 106A may also be fully configured in a manner similar to that shown in FIG. 2. Likewise, in some implementations, network devices, PC's, systems and services may be configured to provide bio and environmental data in configurations such as that illustrated FIGS. 2-3.

Figure 4:
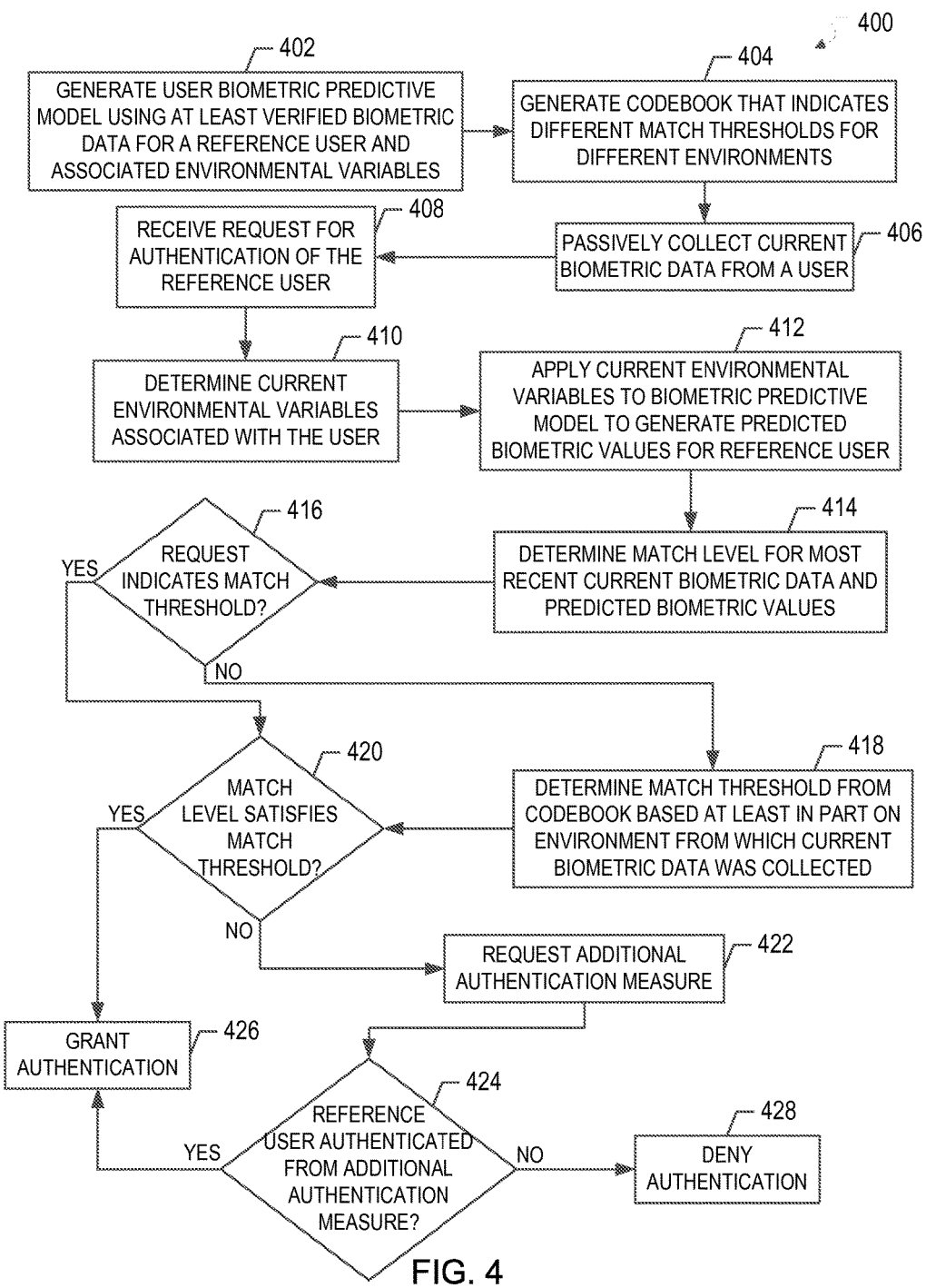
FIG. 4 illustrates a flow diagram of an example process of adaptive biometric and environmental authentication in accordance with one or more implementations.

FIG. 4 illustrates a flow diagram of an example process 400 of an adaptive biometric and environmental authentication in accordance with one or more implementations. For explanatory purposes, the example process 400 is primarily described herein with reference to electronic device 102 of FIGS. 1-2; however, the example process 400 is not limited to the electronic device 102 of FIGS. 1-2, and the example process 400 may be performed by one or more components of the electronic device 102. In one or more implementations, all or part of the example process 400 may be performed by the authentication server 110, rather than, and/or in addition to, the electronic device 102. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The electronic device 102 generates one or more user biometric predictive models using at least verified biometric data for a reference user and associated environmental variables (402). For example, the electronic device 102 may obtain, or receive, biometric information that has been verified to correspond to a particular user, the particular user being referred to herein as the reference user. In one or more implementations, the reference user may enter a password, or perform some other verification, before the verified biometric data is collected, and/or before verifying that collected biometric data corresponds to the reference user. The verified biometric data may be collected in conjunction with one or more environmental variables pertaining to the reference user when the biometric data is being collected, such as time of day, location, user activity information, etc. The verified biometric data may include, for example, a heart rate profile, e.g. average heart rate over a period of time and/or heart rate fluctuations over a period of time, oxygen level profile, blood flow profile, blood-sugar profile, or generally any biometric information that can be passively collected from the user. In one or more implementations, the verified biometric data may be time-varying biometric data of the reference user, e.g. biometric data that varies over short periods of time, such as a day, an hour, a minute, a second, or less.

The electronic device 102 may use the environmental variables as features for the biometric predictive model. In one or more implementations, the electronic device 102 may perform one or more feature selection algorithms to determine one or more of the environmental variables to use as features for the predictive model, such as the environmental variables that are most indicative of the corresponding verified biometric data. The electronic device 102 may use an algorithm, such as a k-nearest neighbor algorithm, to generate the predictive model using at least the determined features and the verified biometric data. In one or more implementations, the electronic device 102 may receive the user biometric predictive model, e.g. from the authentication server 110. The electronic device 102 may then store the biometric predictive model, e.g. in the memory 212 of the secure element 202. In one or more implementations, the electronic device 102 may continuously retrain, or adjust, the user biometric predictive model as additional verified biometric data is received for the reference user.

The electronic device 102 generates a codebook that indicates different match thresholds for different environments (404). In one or more implementations, the codebook may map different environments, e.g. as indicated by different sets of environmental data, to different match thresholds. In one or more implementations, the different environments may be determinable from environmental attributes (e.g. a user being located at home, a user driving a common route), service(s) associated with the user, biometric data collected from the user and/or the identity/owner of the biometric sensor(s).

The electronic device 102 passively collects current biometric data from a user (406). In one or more implementations, the electronic device 102 may collect current biometric data from a user via the one or more electronic sensor devices 106A-C and/or via sensors included in the electronic device 102. The electronic device 102 receives a request for authentication of the reference user from one or more of the authentication requesting devices 104A-B, such as the authentication requesting device 104A (408). The electronic device 102 determines the current environmental variables associated with the user (410).

In one or more implementations, the current environmental variables associated with the user may include, for example, time and/or geographic information associated with the user (e.g., home), collected from the electronic sensor devices 106A-C and/or environmental variables that are determinable from data collected by the electronic sensor devices 106A-C. For example, the electronic device 102 may compare an image previously captured in the reference user's house to an image currently captured by one or more of the electronic sensor devices 106A-C and/or the electronic device 102 to determine that the user is located in their home. In one or more implementations, the environmental attribute may be determinable from the request. For example, the request for authentication of the user may be sent from a smartphone located at the user's home. In one or more implementations, the match threshold may be indicated by the party requesting the authentication, e.g. bank, email server, etc., by providing the match threshold in a tag associated with the request for authentication.

The electronic device 102 applies current environmental variables to the biometric predictive model to generate predicted biometric values for the reference user, e.g. the owner of the electronic device 102 (412). The electronic device 102 determines a match level for the most recently collected current biometric values, e.g. as received from one or more of the electronic sensor devices 106A-C and/or sensors of the electronic device 102, and predicted biometric values (414). For example, the electronic device 102 may determine a distance (e.g. a Hamming distance) between the predicted biometric values and the most recently collected biometric values.

If the received authentication request indicated a match threshold (416), and if the determined match level satisfies the match threshold (420), the electronic device 102 grants the authentication of the reference user to the authentication requesting device 104A, thereby confirming that the user wearing the electronic sensor devices 106A-C is the reference user (426). If the received authentication request did not indicate a match threshold (416), the electronic device 102 determines a match threshold from the codebook based at least in part on the environment from which current biometric data was collected (418). Then, if the match level satisfies the match threshold (420), the electronic device 102 grants the authentication of the reference user to the authentication requesting device 104A (426). Otherwise, if the match level does not satisfy the match threshold (420), the electronic device 102 requests an additional authentication measure (422).

In one or more implementations, the electronic device 102 may repeat the requesting an additional authentication measure (422). For example, the electronic device 102 may keep requesting additional authentication measures until authentication is granted (426), or a timeout expires, or a predetermined number of tries has occurred, or the electronic device 102 completely fails an additional authentication measure. In one or more implementations, if the match level does not satisfy the match threshold (420), the match level may be compared with a predetermined negative threshold. The electronic device 102 may not request an additional authentication measure (422) based on the comparison. For example, if one of the predicted biometric values and the most recently collected biometric values is mismatched by a predetermined amount (e.g., negative threshold), then 102 might decide to completely reject the request for authentication regardless of any other information.

In one or more implementations, the additional authentication measure may include requesting actively collected biometric data from the user, such as a fingerprint, a password, etc. Then, if the reference user is authenticated from the additional authentication measure (424), the electronic device 102 grants the authentication of the reference user to the authentication requesting device 104A (426). If the reference user is not authenticated from the additional authentication measure (424), the electronic device 102 denies the authentication of the reference user to the authentication requesting device 104A (428). In one or more implementations, after the reference user is not authenticated from the additional authentication measure (424), the electronic device 102 may repeat the requesting an additional authentication measure (422). For example, the electronic device 102 may keep requesting additional authentication measures until authentication is granted (426), or a timeout expires, or a predetermined number of tries has occurred, or the electronic device 102 completely fails an additional authentication measure.

Figure 5:
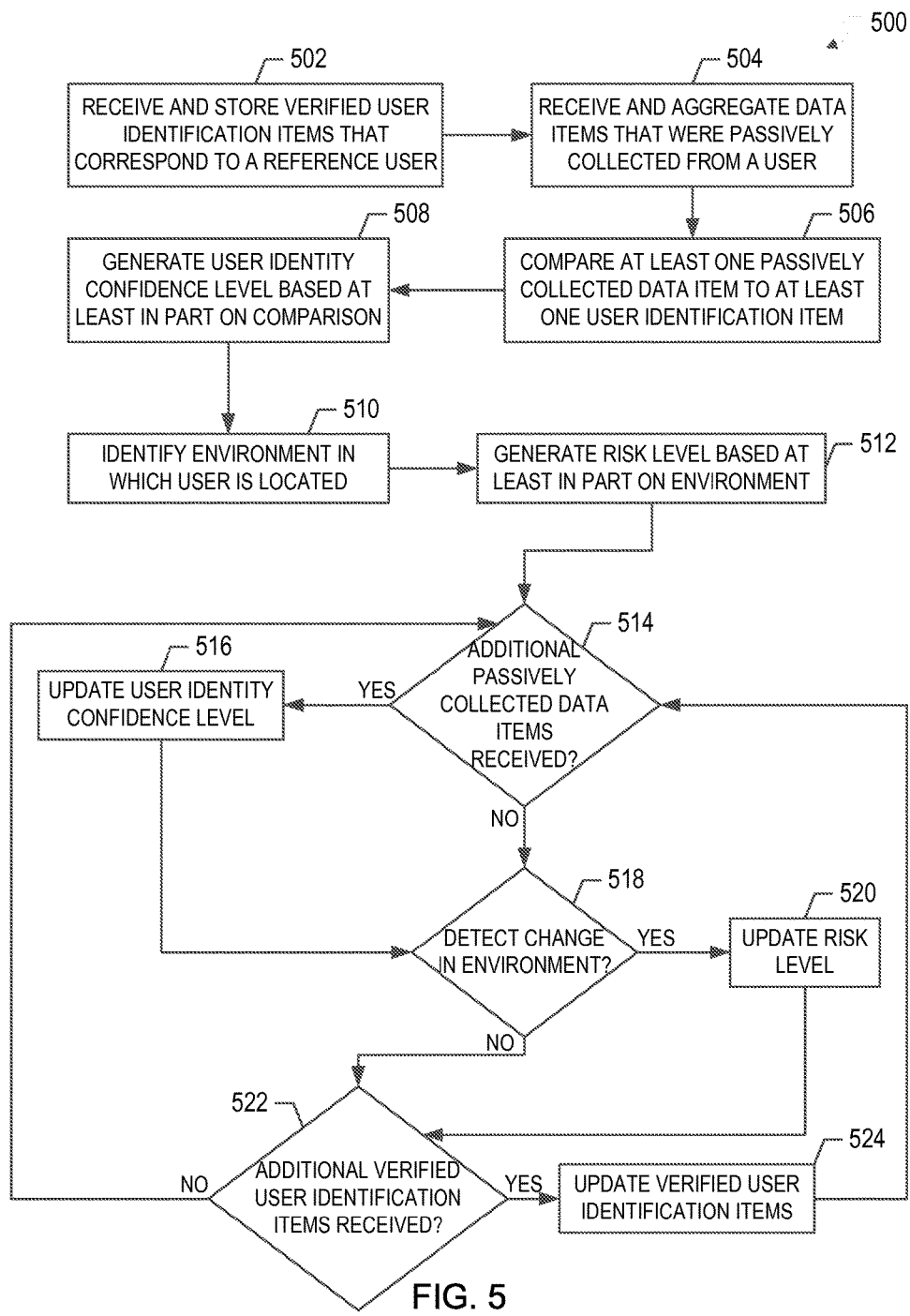
FIG. 5 illustrates a flow diagram of an example process of adaptive biometric and environmental authentication in accordance with one or more implementations.

FIG. 5 illustrates a flow diagram of an example process 500 of an adaptive biometric and environmental authentication in accordance with one or more implementations. For explanatory purposes, the example process 500 is primarily described herein with reference to electronic device 102 of FIGS. 1-2; however, the example process 500 is not limited to the electronic device 102 of FIGS. 1-2, and the example process 500 may be performed by one or more components of the electronic device 102. In one or more implementations, all or part of the example process 500 may be performed by the authentication server 110, rather than and/or in addition to, the electronic device 102. Further for explanatory purposes, the blocks of the example process 500 are described herein as occurring in serial, or linearly. However, multiple blocks of the example process 500 may occur in parallel. In addition, the blocks of the example process 500 may be performed a different order than the order shown and/or one or more of the blocks of the example process 500 may not be performed.

The electronic device 102 may receive and store verified user identification items that correspond to a reference user (502), such as in the memory 212 of the secure element 202. For example, the electronic device 102 may obtain, or receive, user identification items that have been verified to correspond to a particular user, the particular user being referred to herein as the reference user. In one or more implementations, the reference user may enter a password, or perform some other verification, before the verified user identification items are collected, and/or prior to verifying that one or more collected or received user identification items correspond to the reference user. The verified user identification items may include, e.g., full or partial images of the reference user and/or of portions of the reference user's body, such as facial images, hand images, iris images, etc., fingerprint information, a user activity profile that indicates, e.g., activities commonly performed by the user at particular times and/or on particular days, such as going to work, routes typically driven by the user, location profile information for the user, or generally any data items that may be used to at least partially identify the reference user.

The electronic device 102 receives and aggregates data items that were passively collected from a user associated with the electronic sensor devices 106A-C (504). For example, the data items may be passively collected by the one or more electronic sensor devices 106A-C being worn by the user. The electronic device 102 compares at least one passively collected data items to at least one user identification item (506). For example, the electronic device 102 may compare a facial image captured by the electronic sensor device 106B to a user identification item that includes a facial image of the reference user. The electronic device 102 generates a user identity confidence level based at least in part on the comparison (508). The user identity confidence level may be determined based at least in part on the amount that the compared user identification item is indicative of the user and/or the amount that the passively collected data item matches the user identification item.

The electronic device 102 identifies the environment in which the user is located (510). As noted above with reference to FIG. 4, the environment in which the user is located may be determined from the one or more electronic sensor devices 106A-C. The electronic device 102 generates a risk level based at least in part on the environment (512). For example, electronic device 102 may generate a high risk level if the user is located in an abnormal environment (as indicated by the user's location profile). In one or more implementations, the electronic device 102 may retrieve the risk level from a codebook.

As additional passively collected data are received (514), the electronic device 102 updates the user identity confidence level (516). If a change in the environment is detected (518), the electronic device 102 updates the risk level (520). If additional verified user identification items are received (522), the electronic device 102 updates the verified user identification items (524). Thus, the electronic device 102 may continuously update the user identity confidence level (516), the risk level (520), and the verified user identification items (524), as additional information is received and/or sensed by the electronic sensor devices 106A-C.

Figure 6:
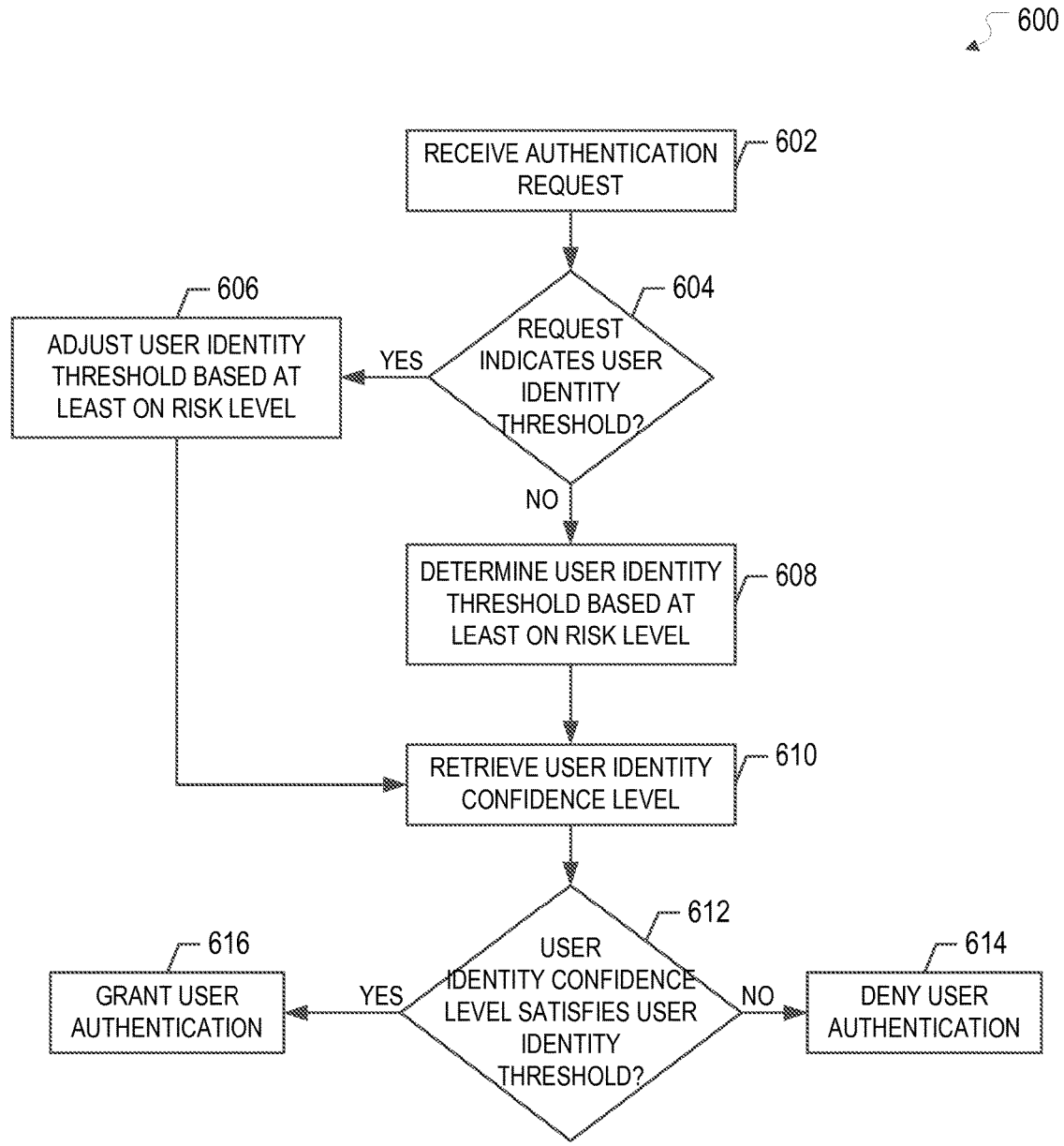
FIG. 6 illustrates a flow diagram of an example process of adaptive biometric and environmental authentication in accordance with one or more implementations.

FIG. 6 illustrates a flow diagram of an example process 600 of adaptive biometric and environmental authentication in accordance with one or more implementations. For explanatory purposes, the example process 600 is primarily described herein with reference to electronic device 102 of FIGS. 1-2; however, the example process 600 is not limited to the electronic device 102 of FIGS. 1-2, and the example process 600 may be performed by one or more components of the electronic device 102. Further for explanatory purposes, the blocks of the example process 600 are described herein as occurring in serial, or linearly. However, multiple blocks of the example process 600 may occur in parallel. In addition, the blocks of the example process 600 may be performed a different order than the order shown and/or one or more of the blocks of the example process 600 may not be performed.

The electronic device 102 may receive an authentication request from one or more of the authentication requesting devices 104A-B, such as the authentication requesting device 104A (602). The authentication request may be received from the authentication requesting device 104A via NFC or another point-to-point communication protocol. If the authentication request indicates a user identity threshold (604), the electronic device 102 adjusts and/or weights the user identity threshold based at least on the current risk level, e.g. as indicated by the environmental risk assessor module 224 (606). For example, the electronic device 102 may increase the user identity threshold when the current risk level is high and may decrease the user identity threshold when the current risk level is low. The electronic device 102 retrieves a user identity confidence level, such as from the user identity confidence level generator module 218 (610).

If the authentication request does not indicate a user identity threshold (604), the electronic device 102 determines a user identity threshold based at least on the current risk level (608). The electronic device 102 retrieves a user identity confidence level, such as from the user identity confidence level generator module 218 (610). In one or more implementations, the user identity confidence level may be determined as discussed above with reference to FIG. 4. If the user identity confidence level satisfies the user identity threshold (612), the electronic device 102 grants the requested user authentication (616). If the user identity confidence level does not satisfy the user identity threshold (612), the electronic device 102 denies user authentication (614).

The electronic device 102, such as via the authentication module 228, compares the user identity confidence level to the user identity threshold and, if the user identity confidence level satisfies the user identity threshold (612), the electronic device 102 grants the requested user authentication (616). If the user identity confidence level does not satisfy the user identity threshold (612), the electronic device 102 denies user authentication (614). In one or more implementations, the user identity confidence level may satisfy the user identity threshold when the user identity confidence level is greater than the user identity threshold. In one or more implementations, the user identity confidence level may satisfy the user identity threshold when the user identity confidence level is less than the user identity threshold.

Figure 7:
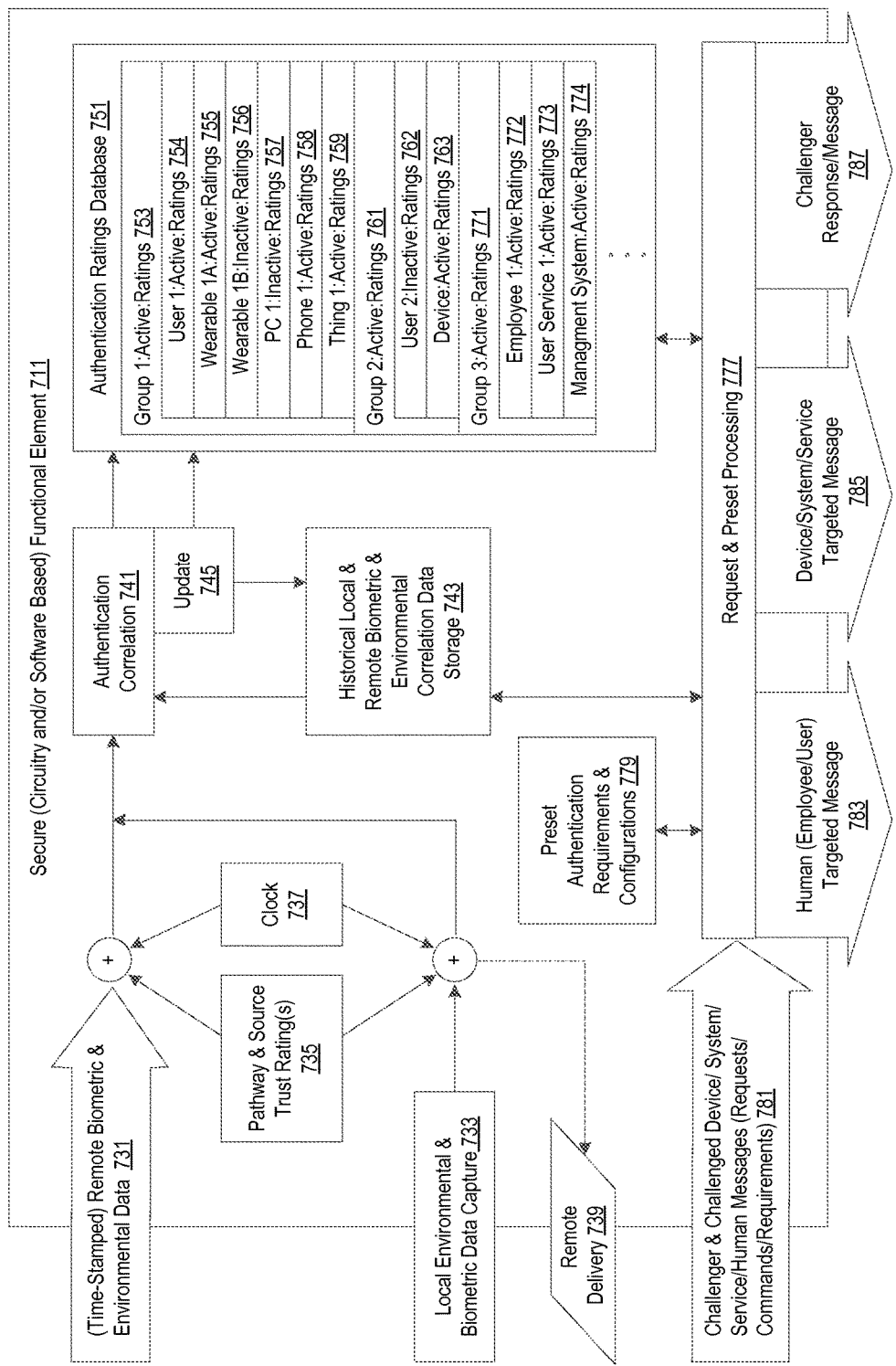
FIG. 7 illustrates an implementation of a secure authentication processing system wherein bio and environmental data as well as challenger requirements cause adaptation of authentication ratings of humans, devices, systems and services and groups of same.

FIG. 7 illustrates a further implementation of a secure authentication processing system wherein bio and environmental data as well as challenger requirements cause adaptation of authentication ratings of humans, devices, systems and services and groups of same. In particular, a secure functional element 711 within a device, system or service supports overall authentication infrastructure. The secure functional element 711 can be found within all challenger and challenged participating nodes, e.g., devices, systems, servers and services, including communication pathway devices, Internet of Things devices, handhelds, wearables, stationary devices and appliances, and any other node that participates in the authentication process through efforts in forwarding, processing, vouching for another group member, gathering bio or environmental data or otherwise assists in contributing to the authentication rating process. Alternatively, in some of such nodes, selected portions or all of the secure functional elements 711 can be scaled down via power down, disabling or exclusion. This may be done for power, processing, communication pathway and other concerns, or where such scaling down involves offloading of responsibilities to one or more other nodes.

For example, a user may be carrying their phone and wearing a health sensing band that requires secure interaction with a cloud based medical service supported by servers and a technical support worker carrying their own tablet. To establish secure interactions, all challenger nodes (i.e., each of the servers and the service itself) need to authenticate the user and all challenged nodes (i.e., the phone and health sensing band). Likewise, before sending private medical related data, the user and challenged nodes, through a reverse authentication process, need to authenticate the challenger nodes and possibly the technical support worker and tablet. Such authentication and reverse authentication processes could involve a one-time challenge event, or require ongoing challenge maintenance via thresholding, periodic repeat challenges, and/or session termination triggered challenges.

Thus, the multiple full and partial instances of the secure functional elements 711 work together to manage an overall authentication infrastructure and associated processes. For example, referring to the above example, groups of user side devices and the user participate to establish authentication ratings for the user's group and for each underlying participant. A first type of adaptation takes place over time as the user's group participants or underlying status changes (e.g., as some user devices and the user becomes inactive, as other user devices become active, as communication pathways change, and as bio or environmental data ages or changes). Likewise, a challenger group's reverse authentication ratings change over time (e.g., as some challenger devices become active, deactivate or change their operations, as communication pathways and associated trust related thereto change, and as challenger side bio or environmental data ages or changes).

In addition to these natural, over time adaptations, adaptations can be triggered, requested or required by any challenger or challenged group participant. That is, when a challenger and challenged group and group member authentication rating requirements and reverse authentication rating requirements are not met, a triggered second type of adaptation may occur where one or more group participants are provided the opportunity to enhance their authentication rating contributions with goals of boosting current ratings to an acceptable level. For example, the medical cloud service challenger's requirement for a particular authentication rating which is not currently being met by the user's group triggers an authentication contribution enhancement process whereby at least one participant of the challenged (e.g., user's) group is given the opportunity to provide a boosting contribution.

Participants of challenger or challenged groups include (i) human members and wherein boosting may involve engaging in an interactive, supplemental authentication process; and (ii) electronic equipment wherein boosting involves automatic changes to bio and environmental data gathering or sampling (e.g., rates, immediacy, updates/refresh, resolutions, quality, and so on), and automatic or automated recruitment of additional electronic equipment group participants (requesting a neighboring device power up for providing authentication contribution). In addition, group participants' responsibilities can be reduced or dropped from the group if current authentication contribution requirements are not needed. Further, a base level of authentication rating can be maintained which will meet anticipated upcoming or ongoing authentication demands based on historical behaviors associated with the associated (challenger or challenged group).

Specifically, the secure functional elements 711 can be carried out in circuitry, software or a combination of the two depending on the implementation. In other words, each of the illustrated blocks within the secure functional elements 711 may be carried out by processing or control circuitry with or without the aid of software programmed direction. Therein, remote bio and environmental data of the element 731 is received from remote challenged participant devices (i.e., source devices) via one or more various communication pathways (not shown). After receiving any necessary time stamp association via clock element 737 (i.e., where a source device fails to time stamp), the bio and environmental data is associated with both pathway and source device trust parameters or ratings of the element 735. Such parameters or ratings may also be pre-associated in whole or in part by the source device and made available along with the data of the element 731. With such association, an authentication rating contribution value can be generated that discounts the reliability of the actual data, the data of the element 731, received. Such determination is made by the authentication correlation element 741.

Specifically, the authentication correlation element 741 processes the incoming bio and environmental data (along with their time stamping and trust ratings) against historical bio and environmental counterpart data within a database or storage element 743. Depending on the degree of correlation, an authentication contribution weight can be identified and, along with discounting based on source and pathway trust, an overall rating contribution can be established. Such rating contribution is then delivered for storage within an authentication ratings database 751.

For example, if a wearable such as an earpiece collects bio-data regarding echo-performance in a user's ear canal, such bio-data can be relayed through intermediate Internet nodes to reach the secure functional elements 711 as represented by the data of the element 731. After time stamping, a pathway trust rating is assigned, e.g., for the Internet pathway (which might be an end to end encrypted data flow) the trust rating might be relatively high. The source trust might also be relatively high if the earpiece has particular tamper resistance and secure key infrastructure therein (e.g., One Time Programmable key encryption system and cover removal detection). Even so, absent quantum crypto schemes and a fully tamperproof device, a trust rating is produced that is used by the authentication correlation element 741 to devalue the incoming bio-data (i.e., the data of the element 731). High correlation with prior ear canal data suggests a high, positive authentication contribution for the data. But, because perhaps 1 in 50 persons may yield similar ear canal performance, the overall positive contribution to authentication may be relatively low.

Nevertheless, such positive contribution is recorded within a group storage record 753 as part of participant wearable's data 755 of the authentication ratings database 751. Each group storage record, such as the group storage record 753, stores information relating to all authentication group participants. For example, the group storage record 753 may represents a challenged group including a participating user's data 754, a participating wearable's data 755 (e.g., the earpiece), a participating yet inactive wearable's data 756, a PC's data 757, a phone's data 758, and a perhaps stationary Thing's (Internet of Things device) data 759. Each of the data 754-759 may include active, inactive or other status information, current authentication rating contribution information, and device identity and contact (addressing) information. For example, as indicated above, the positive contribution based on canal bio-data correlations and trust devaluation is stored as part of the wearable's data 755. Similar authentication rating contribution data is stored as part of the data 754-759, while overall group wide authentication rating data is stored in the group storage record 753.

Instead of arriving remotely, other authentication related data may arise from within the device that contains the secure functional elements 711. For example, local environmental and bio-data capture functions of the element 733 may be integrated into the user's phone. Some of the functions of the element 733 may be within the secure boundary of the secure functional elements 711 but may also be wholly outside thereof or straddle the boundary as illustrated. In other words, the functions of the element 733 may be more or less secure and thus carry a higher or lower value of the pathway and source device trust parameter or rating of the element 735 which, along with time stamping, are associated and delivered to the authentication correlation element 741 for processing. For example, within a phone, environmental data such as location data (e.g., global positioning data) might be delivered with a relatively high trust rating if such location data originates from within the boundary of the secure functional elements 711. Also within the phone, iris image data (bio-data) captured by a built in imager located outside of a boundary of the secure functional element 711 might receive a more modest trust rating. Both of these trust ratings of course being higher than any counterpart that would be received via an external communication pathway with another remote device.

Upon receiving the trust and time stamp supplemented bio and environmental data, the authentication correlation element 741 makes a comparison with historical data, i.e., counterpart data received numerous times earlier in time. For example, on 75% of Wednesday evenings between 9 PM and 11 PM a user's phone (i) generates a home location of the user as environment data, (ii) receives ear canal data with high correlation to that of the user, and (iii) captures iris image data with high correlation to that of the user. Together, along with a prompted user interaction on several of such occasions, the user assists to establish authentication ratings for earpiece, phone and the user themselves. This history is stored as raw, processed, or summary data within the storage element 743. Thus, when the current Wednesday's canal, iris and location data arrive with high correlation with such history, the authentication correlation element 741 responds by generating an authentication contribution for inclusion within the group storage record 753, e.g., within the wearable's data 755 for the earpiece, within the phone's data 758 for both the iris and location based contributions. Also, the overall group authentication ratings are stored in the group storage record 753.

The authentication correlation element 741 can also be configured to update or add to the historical data collected within the storage 743 as it is received for correlation processing. Updates can also be turned on or off to avoid training the correlation to match false authentication data. That is, update functionality element 745 can be turned on to train the correlation system when commissioning a new device and when authentication is established at a relatively high level. Thereafter, the update functionality element 745 can be turned off until an established training session is desired and re-established with adequate required authentication ratings being active.

The update functionality element 745 associated with the authentication correlation element 741 may also involve modifications to authentication contributions based on aging. For example, iris data correlation that yields a positive contribution might not be considered to have as strong a contribution thirty minutes later. Thus, the positive contribution stored within the phone's data 758 may need to be downgraded over time per update functionality element 745 direction. Alternatively, sampling rate adjustments can be established to maintain an adequate minimum guarantee of maintaining the currently stored positive contribution and thus, in such circumstances, update-downgrading may not be required.

The bio and environmental data of the elements 731 and 733, whether generated locally or remotely, post stamping and trust rating association may also be forwarded to another remote device for processing by a further instance of the secure functional elements 711 within such remote device. For example, challenge groups may share authentication related bio and environmental data even though they service another authentication purpose managed remote from the present device. Similarly, the present device can disable the elements 741, 745, and 743, and authentication ratings database 751, and offload all functionality described above to the remote counterpart and so on. Further, a simple device might only include portions of the secure functional elements 711, with or without associated security mechanism built therein (e.g., one time programmable key processes, tamper detection, secure communication pathways, separate and possibly secure operating systems, hardware and software partitioning, etc.). For example, only the elements 731, 735, 737, 733 and 739 might be present (e.g., in a simple sensor device), and where only trust ratings, stamping, local bio/environmental data capture, and forwarding of remotely received and locally captured bio/environmental data might be supported.

Particular authentication requirements can be delivered via messages 781 or through preset configurations of the element 779. For example, for first time access to a first web server, the present user device embedding the secure functional elements 711 sends an access request to the first web server. In response, the first web server delivers both a device and user challenge as represented by the messages 781. Such challenge may identify authentication rating requirements for both the device and the user. Upon receipt, a request and preset processing element 777 responds by retrieving current device and user rating information from participant data 762 and 763 of group storage record 761. Assuming that the processing element 777 determines that the challenge is met, the processing element 777 communicates its determination data, the rating information, and/or the underlying rating basis data (some of which is from the storage element 743) as specified by the challenge message via the message 787. If the user or user device places restrictions on the message 787, a prompted acceptance may be required before the communication via the message 787 can take place. Alternatively, assuming that the processing element 777 determines that the challenge has not been met but is possible with likely readily available contribution enhancements, the processing element 777 will attempt to gain such enhancements by communicating with the enhancement providing group participant (which may be the user or a user's device) via a message 783 or 785. Such enhancement request may, as mentioned previously, involve user interaction, inactive to active commissioning for bio or environmental capture, modifications to current bio or environmental data sampling parameters, and sampling updates. Results are experienced via further receipts of the data of the elements 731 and 733 which result in contribution changes as reflected within the group storage record 761 post processing by the authentication correlation element 741. Further and more aggressive cycling of attempts to bolster authentication ratings can continue until exhausted or until the challenge has been met. Failures are communicated via appropriate one or more of the messages 783, 785 and 787.

Such functionality also applies to reverse authentication. In much the same manner, a group storage record 771 may include challenger group participants' data 772, 773 and 774. Underlying such data, ratings for challenging participants individually and in sum are carried within the group storage record 771 per direction of the authentication correlation element 741 which generates such data from correlations involving the bio and environmental data of the element 731 received from the challenging device. Alternatively, the reverse authentication processing may be managed by one or several instances of the secure functional elements 711 of the challenger group participant devices, while normal authentication processing is managed by instances within one or more of the challenged group participant devices. A further alternative would be where the challenger group manages normal authentication processing and the challenged group manages the reverse, both via instances of the secure functional elements 711. Management in these alternatives involving, for example, the functionality described above in association with the elements 741 and 777 among others.

In addition to receiving authentication requirements via the messages 781, a particular service or system authentication requirement can be defined and stored (or recorded from previous interactions) within the preset configurations element 779. Thereafter, before attempting access, known requirements extracted from the element 779 can be used to test current authentication ratings for conformance. Thus, bolstering contributions may be conducted before even making an access attempt which might only be attempted if the stored authentication requirements are achieved.

Beyond merely communicating authentication requirements and results, the messages 781, 783, 785 and 787 may comprise commands or requests destined for the present device (that containing the elements 711) or devices and humans far remote but participating as indicated within the groups of the authentication ratings database 751. For example, a challenging device may, if supported or authorized by a challenged user and challenged device, deliver an activation and bio capture command with sampling details defined and with expectations of raw data delivery subsequently in response. Commands might be automatically generated by a device or triggered by a human. Commands might also involve launching of challenging human to challenged human communication interfaces through which VoIP, video or chat sessions might be established. Other commands might involve providing authorization rating overrides, cause and direct updating of the update functionality element 745 to occur and so on.

Figure 8:
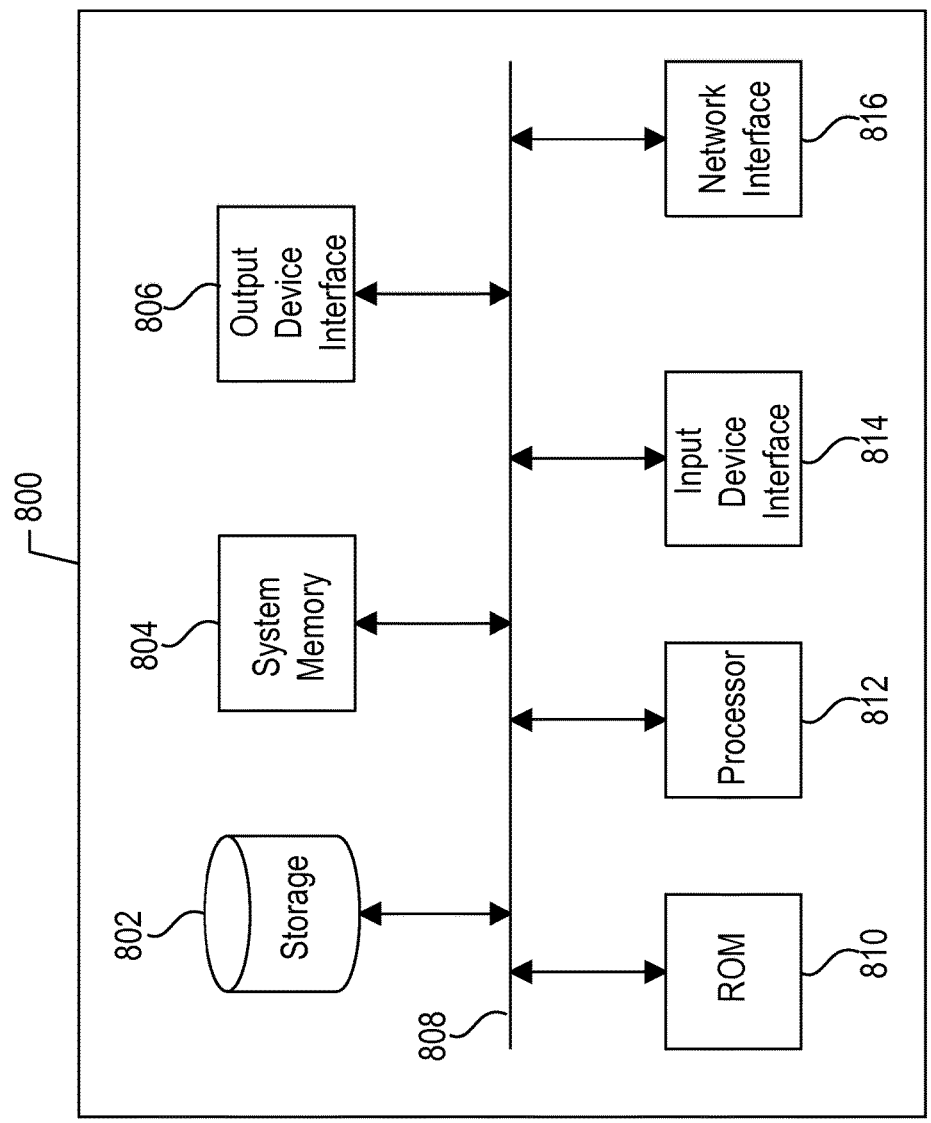
FIG. 8 conceptually illustrates an example electronic system with which one or more implementations of the subject technology can be implemented.

FIG. 8 conceptually illustrates an example electronic system 800 with which one or more implementations of the subject technology can be implemented. The electronic system 800, for example, may be, or may include, the electronic device 102, one or more of the authentication requesting devices 104A-B, one or more of the electronic sensor devices 106A-C, the authentication server 110, a desktop computer, a laptop computer, a tablet computer, a phone, and/or generally any electronic device. Such an electronic system 800 includes various types of computer readable media and interfaces for various other types of computer readable media. The electronic system 800 includes a bus 808, one or more processing unit(s) 812, a system memory 804, a read-only memory (ROM) 810, a writable memory 802, an input device interface 814, an output device interface 806, one or more network interface(s) 816, and/or subsets and variations thereof. In one or more implementations, the read-only memory (ROM) 810 may be a permanent storage device. In one or more implementations, the system memory 804 may be any memory, including for example, ROM and writable memory.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the writable memory 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are utilized by the one or more processing unit(s) 812 and other modules of the electronic system 800. The writable memory 802, on the other hand, may be a read-and-write memory device. The writable memory 802 may be a non-volatile memory unit that stores instructions and data even when the electronic system 800 is off. In one or more implementations, a mass-storage device (such as a magnetic or optical disk and its corresponding disk drive) may be used as the writable memory 802.

In one or more implementations, a removable storage device (such as a floppy disk, flash drive, and its corresponding disk drive) may be used as the writable memory 802. Like the writable memory 802, the system memory 804 may be a read-and-write memory device. However, unlike the writable memory 802, the system memory 804 may be a volatile read-and-write memory, such as random access memory (RAM). The system memory 804 may store one or more of the instructions and/or data that the one or more processing unit(s) 812 may utilize at runtime. In one or more implementations, the processes of the subject disclosure are stored in the system memory 804, the writable memory 802, and/or the ROM 810. From these various memory units, the one or more processing unit(s) 812 retrieve instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, microphones, alphanumeric keyboards and pointing devices (also called "cursor control devices"). The output device interface 806 may enable, for example, the display of images generated by the electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information, such as a speaker. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 8, bus 808 also couples electronic system 800 to one or more networks (not shown) through one or more network interface(s) 816. The one or more network interface(s) may include an Ethernet interface, a WiFi interface, a multimedia over coax alliance (MoCA) interface, a reduced gigabit media independent interface (RGMII), a Bluetooth IP networking interface or generally any interface for connecting to a network. In this manner, electronic system 800 can be a part of one or more networks of computers (such as a local area network (LAN), a wide area network (WAN), or an Intranet, or a network of networks, such as the Internet. Any or all components of electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature (e.g., not a transitory signal).

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware (e.g., circuitry) and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that not all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for environmentally adaptive passive biometric authentication, the method comprising:
   generating at least one user biometric predictive model for a reference user based at least on historical biometric data passively collected from at least one biometric sensor and environmental attributes associated with the reference user when the historical biometric data was passively collected;
   passively collecting current biometric data for a user from the at least one biometric sensor;

receiving, from an authentication requesting device, a request for authentication of the reference user, the request for authentication including a tag;

in response to the request:
generating predicted biometric data by applying current environmental attributes associated with the user to the at least one user biometric predictive model;

determining a match level for the current biometric data based at least on a distance between the current biometric data and the predicted biometric data generated by the at least one user biometric predictive model; and granting the authentication when the match level satisfies a match threshold associated with an environment in which the user is located, wherein the match threshold is determined based on the tag included in the received request for authentication.

2. The method of claim 1, further comprising:
requesting an additional authentication measure from the user when the match level fails to satisfy the match threshold.

3. The method of claim 2, wherein the additional authentication measure comprises requesting actively collected biometric data from the user.

4. The method of claim 1, wherein the historical biometric data and the current biometric data comprises time-varying biometric data.

5. The method of claim 1, wherein the environment in which the user is located is determinable from a location information or time information that is associated with, or determinable from, the at least one sensor.

6. The method of claim 1, further comprising:
generating a codebook that indicates a plurality of match thresholds for a plurality of different environments; and
determining the match threshold for the environment in which the user is located based at least on the codebook.

7. A device comprising:
a user identity reference module that is configured to maintain user identification items stored in a secure memory, at least one of the user identification items at least partially identifying a reference user;
a passive data aggregator that is configured to receive and aggregate data items that are passively collected by at least one device that is in proximity to a user;
a user identity confidence level generator that is configured to generate a user identity confidence level that indicates a confidence that the user in proximity to the at least one device is the reference user based at least in part on a comparison between at least one of the passively collected data items and at least one of the user identification items, and to update the user identity confidence level as additional passively collected data items are received; and
an authentication module that facilitates user authentication based at least in part on the user identity confidence level.

8. The device of claim 7, wherein the authentication module is further configured to:
receive a request for authentication of the reference user, the request comprising a user identity threshold; and
grant the authentication of the reference user when the user identity threshold is satisfied by at least the user identity confidence level, otherwise denying the authentication of the reference user.

9. The device of claim 7, further comprising:
an active data aggregator that is configured to actively collect an authentication data item from the user when the user identity confidence level falls below a threshold.

10. The device of claim 7, wherein the user identification items comprise at least one of a facial image of the user, an activity profile of the user, a location profile of the user, a heart rate profile of the user, a hand image of the user, an encephalogram waveform of the user, or an iris image of the user.

11. The device of claim 7, wherein at least one of the user identification items is passively obtainable time-varying biometric data.

12. The device of claim 7, further comprising:
an environmental risk assessor that is configured to determine a risk level of an environment associated with the user based at least in part on location information or time information determinable from the passively collected data items, and update the risk level as the additional passively collected data items are received.

13. The device of claim 12, wherein at least one of the passively collected data items comprises metadata that is indicative of at least one of the location information or the time information.

14. The device of claim 12, wherein at least one of the user identification items comprises a first image that is at least partially indicative of a location associated with the user and the location information is indicative of the location when at least one of the passively collected data items comprises a second image that at least partially matches the first image.

15. The device of claim 12, wherein the user identity confidence level generator is further configured to:
weight the at least one comparison between at least one of the passively collected data items and at least one of the user identification items based on an amount that the at least one of the user identification items at least partially identifies the reference user.

16. A computer program product comprising instructions stored in a non-transitory computer-readable storage medium, the instructions comprising:
instructions to receive passively collected data items from at least one device that is in proximity to a user;
instructions to determine a user identity likelihood value that indicates a likelihood that the user corresponds to a reference user by comparing at least one of the passively collected data items to a user identity reference model associated with the reference user;
instructions to update the user identity likelihood value as additional passively collected data items are received; and
instructions to facilitate authentication requests associated with the reference user based at least on the user identity likelihood value.

17. The computer program product of claim 16, further comprising:
instructions to receive one of the authentication requests associated with the reference user; and
instructions to grant authentication when the user identity likelihood value satisfies a user identity threshold.

18. The computer program product of claim 17, further comprising:
instructions to determine an environment associated with the user based at least on the passively collected data items;

instructions to assess a risk level associated with the environment; and instructions to adjust the user identity threshold based at least in part on the risk level.

19. The computer program product of claim 16, further comprising:

instructions to decrease the user identity likelihood value when the additional passively collected data items are not received for a period of time.

20. A device comprising:

processing circuitry that is configured to:

gather bio-data and environmental data, wherein at least one of the bio-data and the environmental data is received from another device;

evaluate the bio-data and the environmental data to identify a first authentication rating;

compare the first authentication rating with an authentication challenge requirement;

interact, in response to the comparison, to bolster a contribution to the first authentication rating; and identify a second authentication rating that meets the authentication challenge requirement.

21. The device of claim 20, the processing circuitry further being configured to:

receive a series of bio-data samples over time from the another device;

analyze each sample of the series of bio-data samples to produce a corresponding series of authentication contributions; and apply the series of authentication contributions to maintain the second authentication rating.

22. The device of claim 21, wherein the processing circuitry is further configured to:

adjust the second authentication rating to reflect that receipt of the series of bio-data samples has ended.

23. The device of claim 21, wherein the processing circuitry is further configured to:

compare each sample of the series of bio-data samples with historical data as each sample is received; and respond to the comparison of each sample by producing the authentication contribution of the series of authentication contributions that corresponds to each sample.

24. The device of claim 23, wherein the processing circuitry is further configured to:

adjust the second authentication rating to accommodate the authentication contribution that corresponds to each sample of the series of bio-data samples.

25. The device of claim 21, wherein the series of bio-data samples are received from the another device via a first communication pathway.

26. The device of claim 20, wherein the processing circuitry is further configured to:

establish a plurality of devices that participate in a group authentication, the plurality of devices including the another device;

store authentication contribution data for each of the plurality of devices, a portion of the authentication contribution data constructed at least from the bio-data gathered by the another device;

produce the second authentication rating based on the authentication contribution data; and modify the second authentication rating over time as further authentication contribution data is received.

* * * * *